Figure 1:
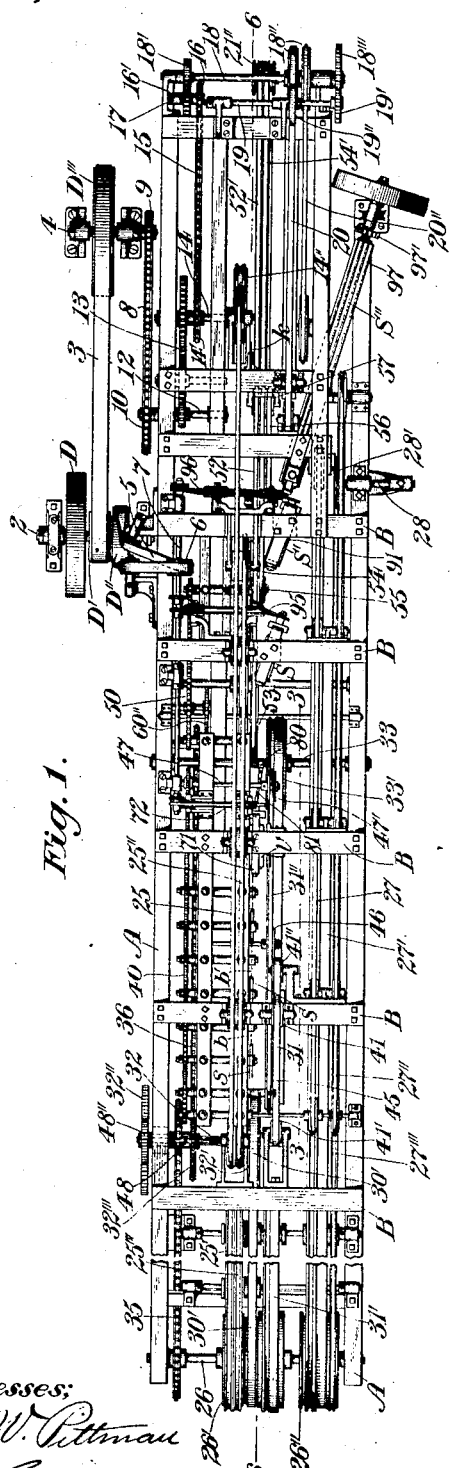

G. P. BUTLER.
TOBACCO LEAF STEMMING MACHINE.
APPLICATION FILED OCT. 5, 1898.

920,264.

Patented May 4, 1909.
8 SHEETS—SHEET 1.

Witnesses:

Inventor:
George P. Butler
By his Attorney,

G. P. BUTLER.
TOBACCO LEAF STEMMING MACHINE.
APPLICATION FILED OCT. 5, 1898.

920,264.

Patented May 4, 1909.
8 SHEETS—SHEET 2.

Witnesses:

Inventor:
George P. Butler
By his Attorney,

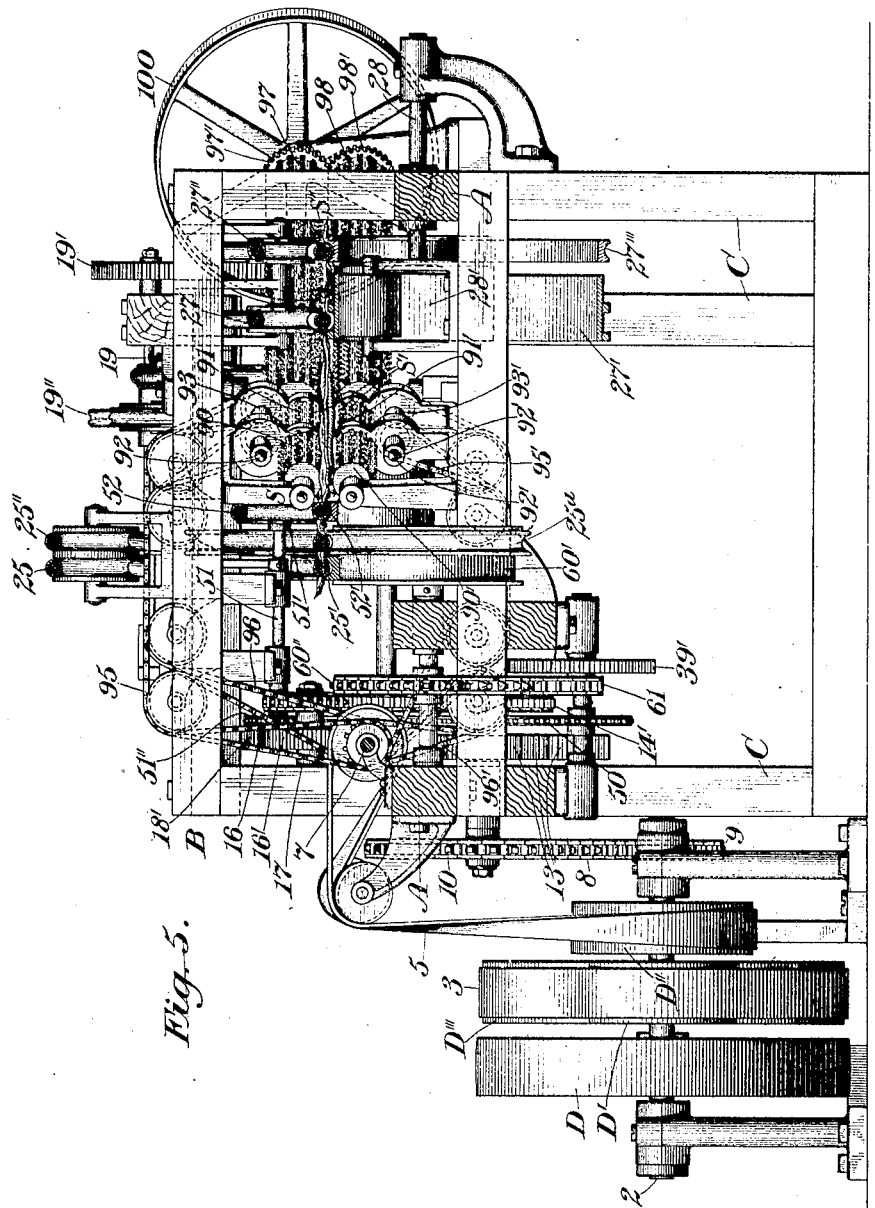

G. P. BUTLER.
TOBACCO LEAF STEMMING MACHINE.
APPLICATION FILED OCT. 5, 1898.
920,264.
Patented May 4, 1909.
8 SHEETS—SHEET 5.
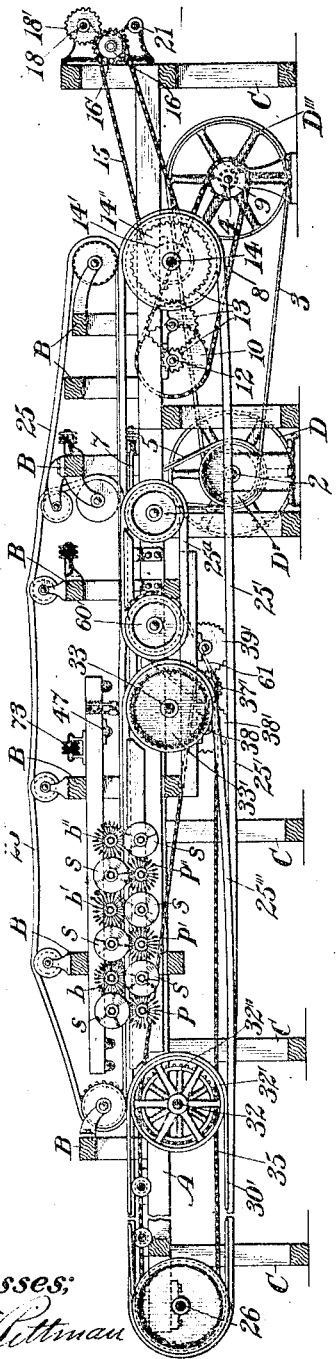
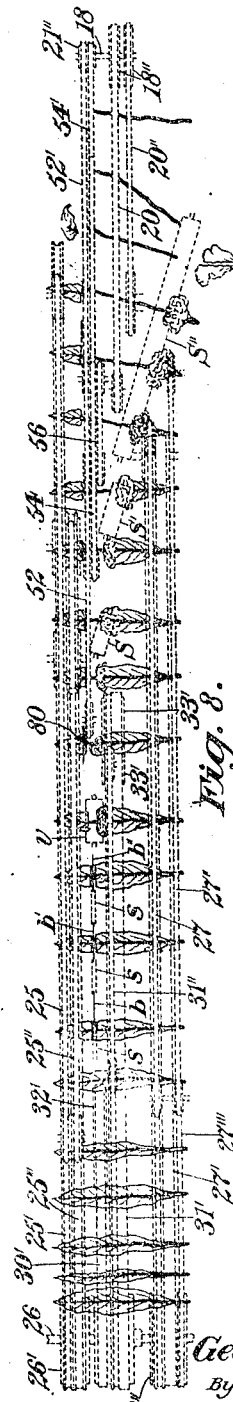
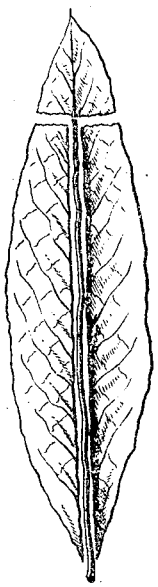
Witnesses:
Inventor:
George P. Butler
By his Attorney,

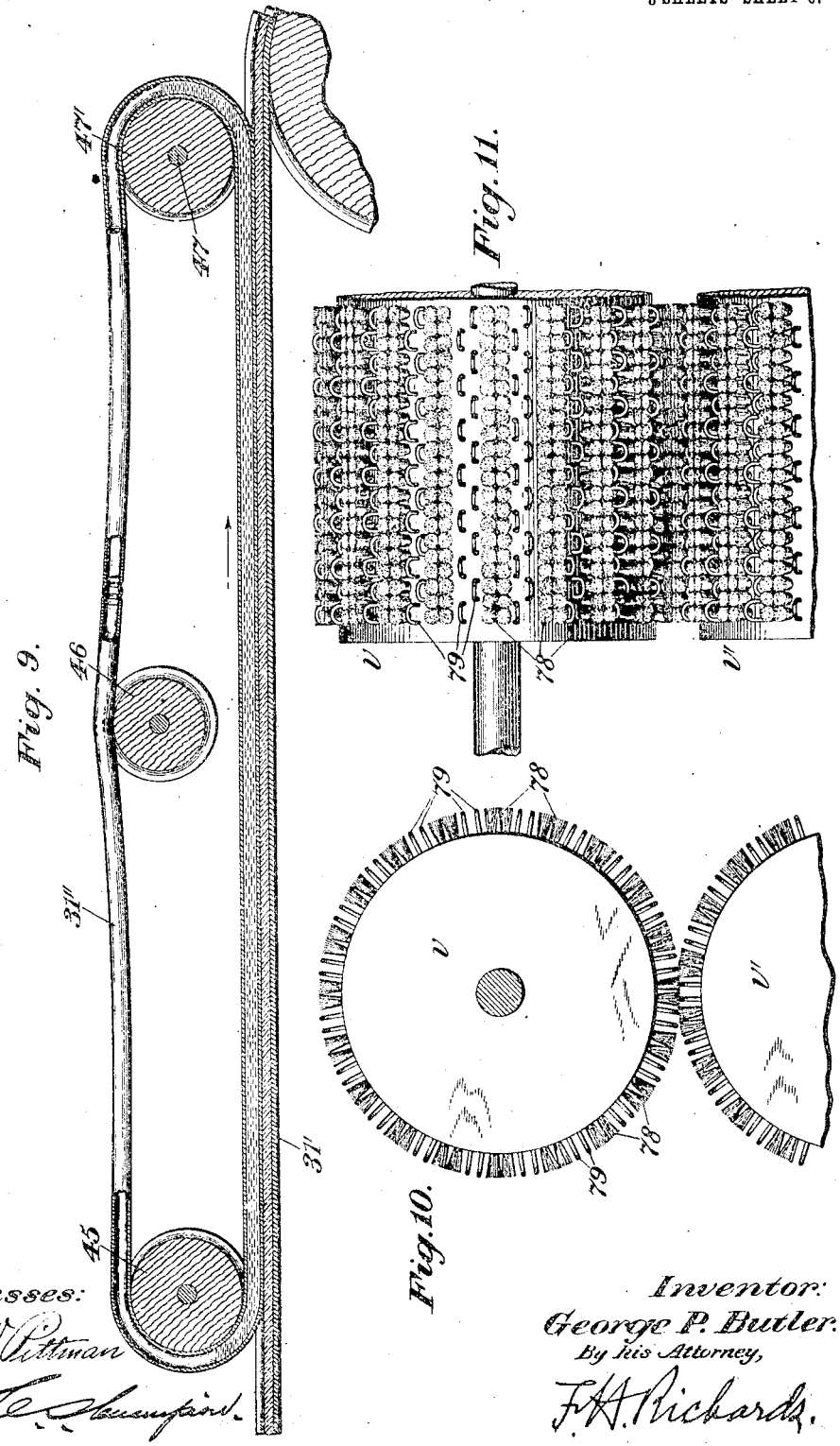

G. P. BUTLER.
TOBACCO LEAF STEMMING MACHINE.
APPLICATION FILED OCT. 5, 1898.

920,264.

Patented May 4, 1909.
8 SHEETS—SHEET 7.

Witnesses:
R.W. Pittman
E. Ocampini

Inventor:
George P. Butler.
By his Attorney,
F.H. Richards

G. P. BUTLER.
TOBACCO LEAF STEMMING MACHINE.
APPLICATION FILED OCT. 5, 1898.

920,264.

Patented May 4, 1909.
8 SHEETS—SHEET 8.

Witnesses:
R. W. Pittman
C. Champion

Inventor:
George P. Butler
By his Attorney,
F. H. Richards

UNITED STATES PATENT OFFICE.

GEORGE P. BUTLER, OF NEW YORK, N. Y.

TOBACCO-LEAF-STEMMING MACHINE.

No. 920,264. Specification of Letters Patent. Patented May 4, 1909.

Application filed October 5, 1898. Serial No. 692,759.

*To all whom it may concern:*

Be it known that I, GEORGE P. BUTLER, a citizen of the United States, residing in New York, in the county of New York and State of New York, have invented certain new and useful Improvements in Tobacco-Leaf-Stemming Machines, of which the following is a specification.

This invention relates to leaf-treating machines, and especially to machines for stemming tobacco or similar leaves.

The present invention is in the nature of an improvement upon that shown, described and claimed in my prior patent No. 615,248 granted December 6, 1898, and embodies many features not contained in said patent all of which at the present time are deemed desirable for the purpose of properly operating upon a leaf to separate the blade and stem portions thereof from each other.

My present improvements are applicable to any leaf-treating machine in which the stem and the blade of the leaf are separated by stemming from any point in the length thereof in either or both directions, but in the preferred construction of the machine embodying these improvements the stemming will be effected from a point near the tip of the leaf toward the butt end thereof.

When a leaf is stemmed by stripping the blade portion from the stem, and especially when the blade is stripped from the tip toward the butt of the leaf-stem, it is desirable to hold the stem firmly especially near the tip end of the leaf, where the stem is somewhat thin and weak and liable to be broken, and in stemming-machines as heretofore constructed no adequate provision has been made, so far as I am aware, for gripping the stem firmly at different points in the length thereof, and especially along the weaker end of the stem during the stripping of the blade from such stem.

One of the main objects of my present improvements is the provision of changeable-grip leaf-holding or stem-holding means for holding the leaf or its stem at different points in the length thereof at different times during the treatment or stemming of the leaf.
Usually the stem-holding or stem-gripping means will embody a plurality of holding elements or gripping-faces successively-effective at different points in the length of the stem during the stemming operation, it being intended that as more and more of the blade portions of the leaf are separated from the stem the stem shall be regripped at one or more points in its length, the re-gripping following the stripping action as closely as may be deemed necessary. As the leaves to be stemmed are ordinarily fed forward by suitable feed mechanism while they are being stemmed, it will be seen that in a mechanism constructed to operate thus, the re-gripping of the leaf or stem will take place at a point considerably in advance of that at which the leaf is first engaged by the holding and feeding means, and that if the leaf or stem is re-gripped several times such re-gripping will take place at successive points in the direction of feed of the leaf, as well as at successive points in the length of the stem from the tip toward the butt, or in such other direction as may be characteristic of the stemming operation.

The leaf or stem is held or gripped, and afterward re-gripped, to the best advantage by parallel holding or gripping and re-gripping devices, such as endless conveyers or belts disposed in pairs between which the leaf or leaves may be held and fed, and it will be evident that when such parallel feed-belts or conveyers are employed they will be of different lengths, the main belt or belts serving to engage the leaf and feed forward the same as it enters the feed mechanism, while the re-gripping belt or belts will engage the leaf after the latter has been fed forward some distance, and usually after the leaf has been operated upon by one or more of the leaf-treating devices. Ordinarily the leaf will be held and fed by gripping it near one or both ends, and in the present construction both tip-gripping and butt-gripping devices or feed-belts may be employed, in order that each leaf may be held firmly at two fixed points in the length thereof, and afterward re-gripped and tensioned between such points during the proper steps in the treatment of the leaf.

Another important feature of the present improvements is the provision of means for tensioning the leaf or stem in order that the operating devices may coact with the leaf to the best advantage. The leaf-tensioning means may be of any suitable type; but I prefer to employ a device effective for tensioning the leaf between the two fixed points at which it is gripped by leaf-holding means effective at separated points in the length of the leaf or its stem, the preferred construction being that in which a stem-gripping tension device is disposed between the parallel holding devices or belts and tensions the leaf or stem after such leaf has been fed forward some distance. In this construction the re-gripping devices or belts may also constitute tensioning means, and hence where two or more belts are used for re-gripping they will constitute tensioning and re-tensioning devices for taking up the leaf or stem at successive points in the direction of feed as the leaf is operated upon by the leaf-treating devices. When the leaf or its stem is held firmly at two different points in the length thereof by holding devices having a fixed interval between them the tensioning will, of course, be effected by bending the leaf or stem away from a straight line, and preferably each leaf-bending or stem-bending tension device is so constructed as to crease a certain definite portion of the stem usually between fixed points thereof, as just indicated, without disturbing the original transverse position of the remainder of the stem. The crease so made will ordinarily be substantially U-shaped, as I find that this can be made readily without breaking the fibers of the stem or injuring the blade portion of the leaf. The re-gripping devices or belts when they also constitute the tension devices will, of course, serve as stem-creasing or stem-bending members, and when so used will be constructed in a novel manner. Each pair of coacting or complementary leaf-feeding conveyers or belts will usually consist of a longitudinally-channeled or grooved belt and a coöperating belt or band fitting such channel or groove, the preferred construction being that in which one belt has a convexed or rounded working face and the other a correspondingly-concaved face.

In order that the feed-belts just described may operate most effectively it is desirable that the belts of each pair be held firmly in engagement with each other, and for this reason one belt of each pair may be suitably weighted in such a manner as to assure its proper coaction with the other belt. A feed mechanism embodying a feed-belt weighted in such a manner as to hug a coöperating feed member or belt and grip a leaf firmly constitutes one of the most important features of this invention. Such a belt should obviously lose nothing of its flexibility when so weighted, and for this reason a freely mobile medium should constitute the means for weighting the belt. Obviously this mobile weighting medium should also be heavy, and many different media might be employed which would fulfil these two conditions, and in the construction shown in these drawings a heavy liquid, such as mercury, is employed for weighting one or more belts, and solid shot for weighting others. When it is desired to hold the leaf or stem very tightly mercury will usually be employed on account of its greater weight. Moreover, when the belt containing the mobile weighting medium is a tubular one, as will ordinarily be the case, and the opening extends throughout the entire length of the belt, the latter may be only partially filled, especially if the belt is disposed in a substantially horizontal position, when only the lower run of the belt need contain the freely-movable mercury.

In several respects the main feeding means for gripping the leaf and carrying the same forward is a radical departure from the corresponding means shown in my prior patent hereinbefore referred to, the principal feature of difference, however, being the employment of continuous conveyers or feed-belts instead of the separate opening and closing clamping members shown in the former case. In order that they may grip the leaf and its stem most effectively during the feeding operation these main holding and feeding belts should be disposed in pairs, one of which is usually channeled and the other shaped to fit in such channel and crease the leaf or stem in substantially the manner hereinbefore described, in order that the leaf may be held firmly at one or more points, as near the tip and butt ends thereof. The several elements of the leaf holding and feeding mechanism, viz., the main holding means and the re-gripping device or devices may also be differentially effective as creasing devices, some of them operating to crease the leaf or stem to different depths from others. All of these feed devices or belts should, however, in order to operate to the best advantage, be faced with rubber where they are intended to engage the leaves.

In stemming tobacco-leaves by machinery it has been found extremely difficult to sever the blade portions and veins of the leaves transversely and then separate such blade portions and the stem without breaking the latter; and another important feature of the present improvements is the employment of means which will overcome the difficulties heretofore encountered in treating leaves in this manner. In my prior patent hereinbefore referred to I have illustrated devices suitable for the purpose of severing the blade portions of the leaf transversely, and this being the best means known to me at this time for the purpose is retained in the present construction, but a novel vein-severing device is employed in connection therewith.

The blade portion of a leaf of almost any kind, and especially of a tobacco-leaf is, as is well known, quite tender and easily severed or ruptured, while the veins being considerably stronger and tougher are not so readily severed, and the stem, which is the strongest and toughest part of the leaf, is, of course, the most difficult part to cut or rupture. A device, therefore, which might easily sever or puncture the blade portion of the leaf would not necessarily be capable of parting the veins, and one which would sever or break the veins might not be capable of parting the stem of the leaf. Upon these facts depends the use of the different severing media which constitute the main features of the leaf-treating mechanism embodying my present invention; and I have illustrated herein a plurality of severing devices of different efficiencies as severing media, the blade-severing means being so constructed as to part the blade portion of the leaf without breaking the veins, while the vein-severing means will sever or break the veins without parting the stem of the leaf, these several media being therefore of successively-increasing efficiencies, their efficiencies usually increasing in the order of their operation. In connection with this portion of my present invention it should be noted that not only may the devices for operating upon different parts of the leaf be differentially effective, but the blade-severing means may be made up of a plurality or series of puncturing devices of different efficiencies as blade severing or puncturing media, the blade-severing means employed in this case embodying a plurality of devices operative for making punctures or perforations of different lengths or in different positions in the blade portions of a leaf, the lengths of the punctures usually increasing as the leaf comes into position to be operated upon by successive blade-severing or puncturing devices.

A blade-puncturing device embodying a plurality of puncturing members yieldingly mounted in such a manner as to avoid the veins and stem of a leaf is the preferred means for severing the blade of a leaf transversely; and as I have found that vein-severing devices which operate with a cutting action are liable to cut the stem also, I consider it of the utmost importance to employ in a machine of this type some means which will exert upon the veins of the leaf a force sufficient to rupture the same, which force, however, will be utterly inadequate for rupturing or breaking the much stronger and tougher stem.

As before explained, tobacco and similar leaves are naturally of such a structure as to render it practicable to employ severing media for the blade portions, veins and the stem, which media may be of such construction that the least effective will not break the veins, while the vein-severing medium may be incapable of rupturing the stem; and as cutting devices, so far as I am aware, will not operate in this manner, but may at any time cut entirely through the stem if a leaf is improperly positioned, I believe that the employment of a vein-severing device which will exert a force or stress sufficient to break or rupture a leaf-vein, but insufficient to rupture or materially weaken a leaf-stem, is a distinct advance in the mechanical treatment or stemming of leaves, and I consider within the scope of my invention any construction embodying a blade-severing device and also having a vein-breaking device of higher efficiency as a severing medium and operative for parting a vein without cutting it.

The means which I prefer to employ for severing the veins of a leaf is a device having a plurality of blunt members or elements usually of different degrees of elasticity, the device illustrated herein being a leaf-treating brush having a circuit of elements, or rows of elements alternately yielding and rigid, and the rigid elements being of any suitable type, such as metallic staples, while the yielding elements will usually be brush-tufts. This vein-severing device or brush is intended to rotate and preferably will coöperate with another similar brush, and the alternating elements or rows of elements should be regularly spaced for the reason that in practice the rigid elements of one brush will coact or intermesh with the yielding elements of a coöperating brush to break the veins. I have found that this organization of the co-acting rotary brushes is important, as co-acting rigid elements of the brushes would be liable to break the stems, while coacting yielding elements probably would not exert a stress sufficient to break the veins. A leaf-treating member or brush of this type constitutes a suitable means for stemming the leaf by stripping the blade portion thereof from the stem, and in the machine illustrated in the drawings of this application the vein-severing brushes operate to effect a preliminary or partial stemming simultaneously with the vein-severing operation, and, moreover, the main stemming operation is also preferably effected by similar brushes.

As before stated, my improved machine is intended to feed the leaves forward and to part or sever the blade portions and veins thereof in a line transverse to the stem of each leaf, and hence many of the leaf-treating and feeding devices will ordinarily be disposed in alinement with one another. In this case the first re-gripping and tensioning device or belt is intended to operate in the line of separation of the blade, and hence substantially in alinement with the blade severing or puncturing devices, this re-gripping device serving to engage the leaf-stem at a point where it has been laid bare by the removal of a strip of the blade; and I prefer to provide a clearing device, such as a rotary brush, for forcing or holding back the blade longitudinally of the leaf just before the bare portion of the stem is engaged by the re-gripping device, as otherwise the re-gripping belt may engage and hold a portion of the blade which is to be separated from the stem. Of course the vein-severing device operates in alinement with the blade-severing means, and further on in the operation the leaf-stem may be severed by a cutting or other member also in alinement with the blade-puncturing devices.

In stemming a leaf from a given point in the length thereof toward either end of the leaf the thickness and strength of the stem vary progressively, and, of course, in stemming from the tip toward the butt the strength of the stem increases gradually. At the beginning of the stemming operation, therefore, it is desirable to separate the blade portions and stem somewhat carefully, while later on not so much care is required and more force may be used, and hence the operation of stemming may be materially quickened. For this reason I deem is desirable to employ a plurality of stemming devices of different efficiencies as stemming media, these stemming devices, which will usually be rotary brushes, being disposed ordinarily at successively-steeper angles to the line of feed of the leaf, and therefore operating to strip the blade portion of the leaf from the stem more rapidly as the stemming operation progresses from the tip toward the butt. The last stemming device may also be operated at a higher rate of speed than the other or others.

Other features of my present improvements refer to a gravitative clamping device for pressing coacting leaf-feeding conveyers tightly against intermediate leaves to be fed, and they treat also of certain other matters which will be hereinafter described.

Figure 2:
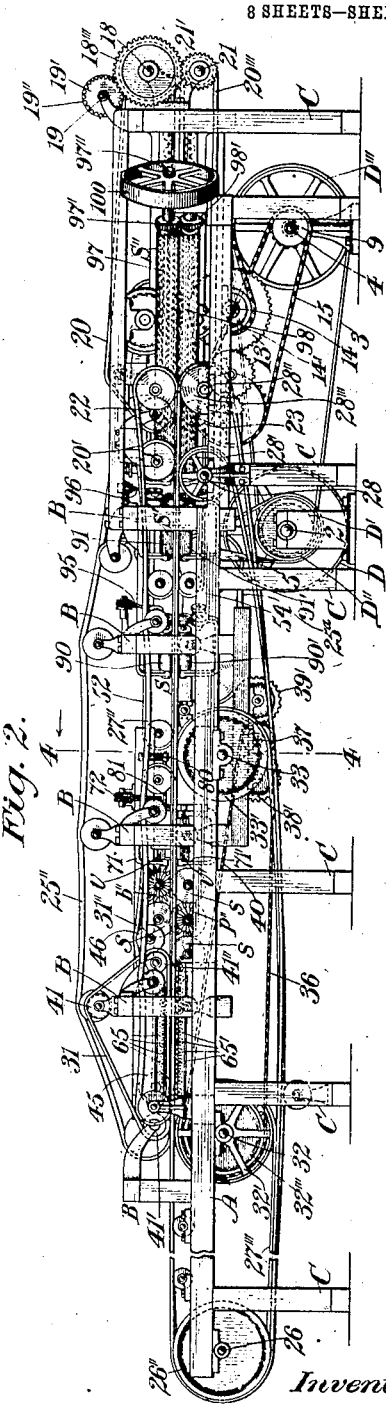
Figure 3:
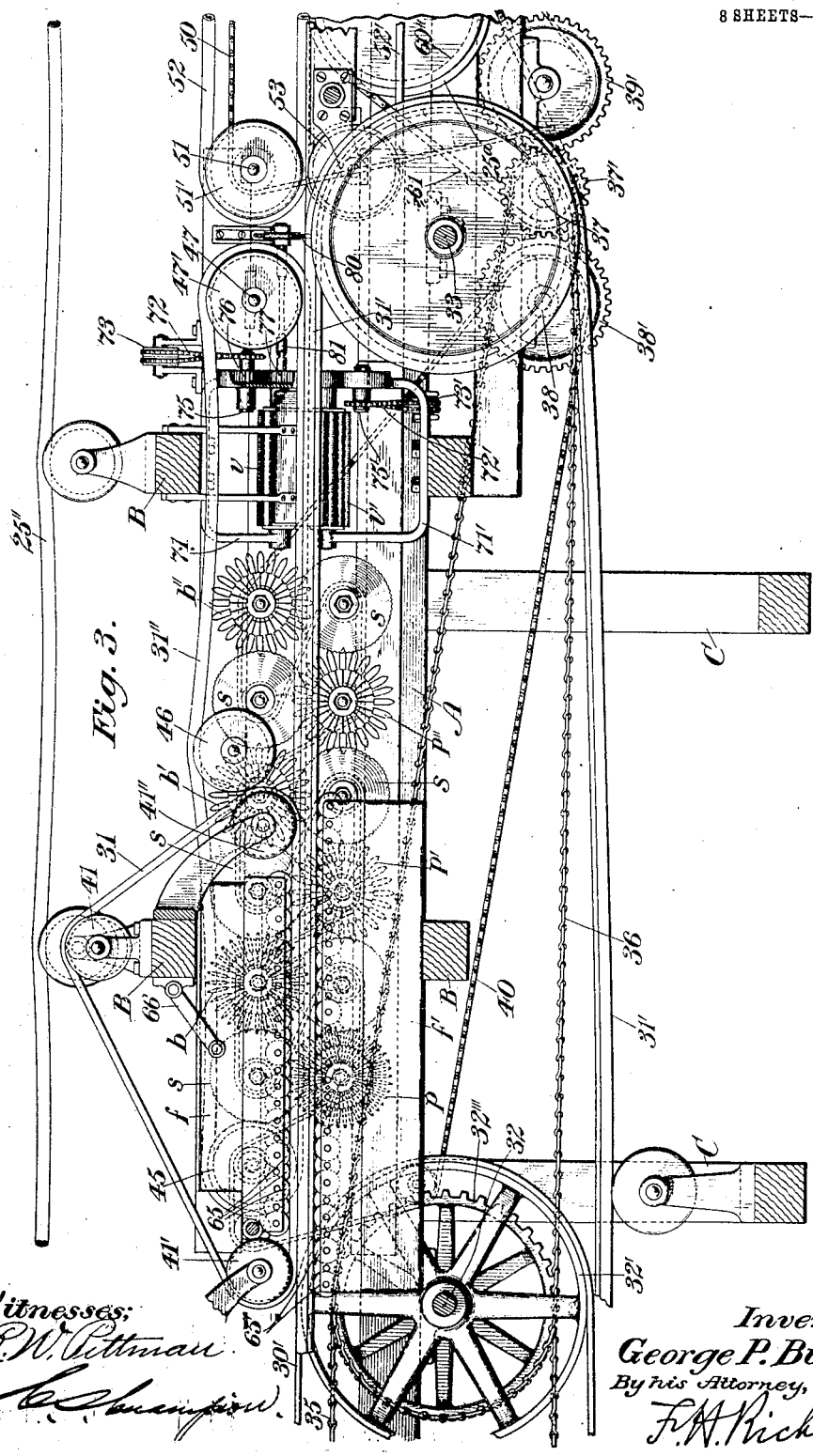
Figure 4:
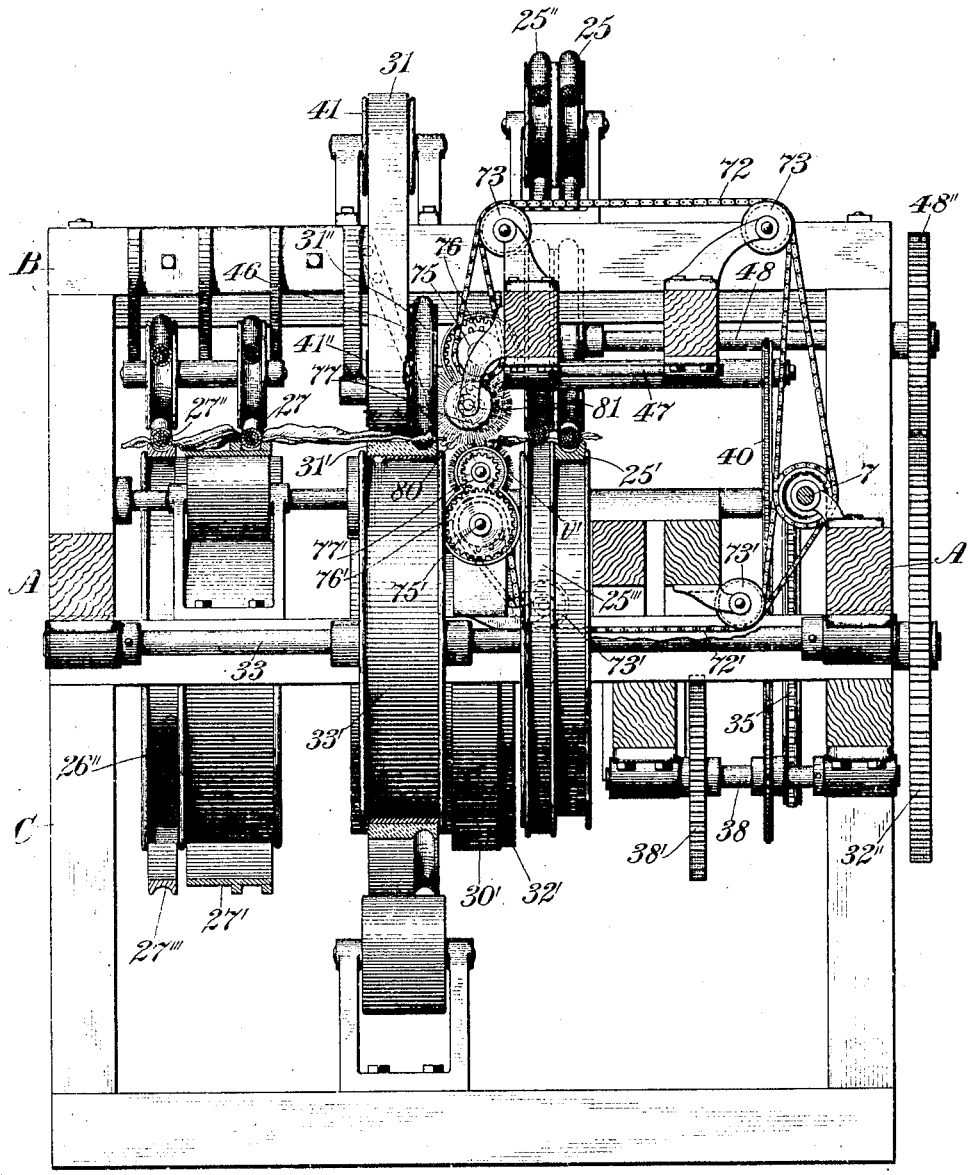
Figure 14:
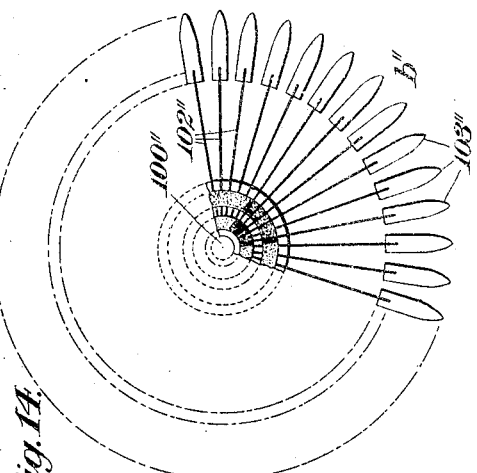
Figure 13:
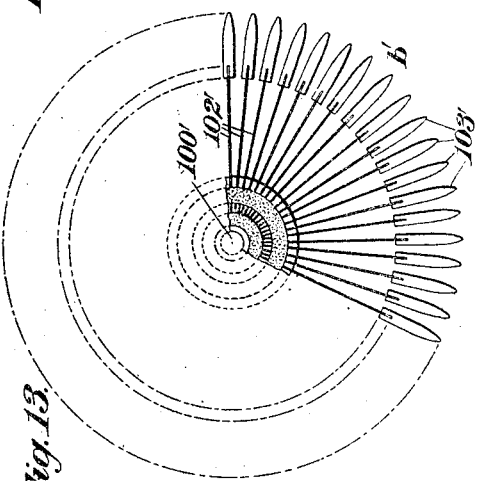
Figure 12:
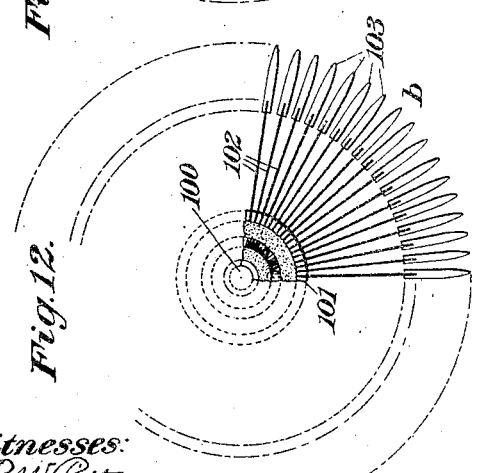
Figure 17:
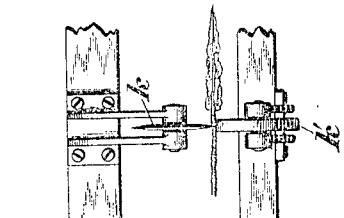
Figure 16:
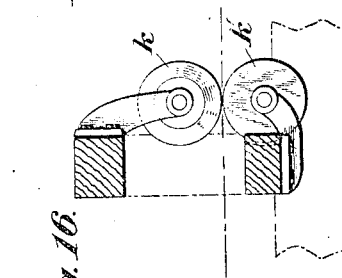
Figure 15:
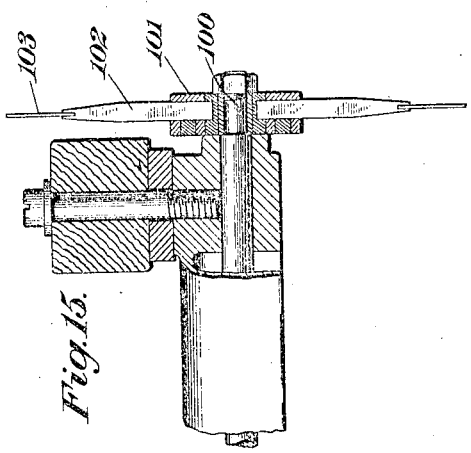
Figure 18:
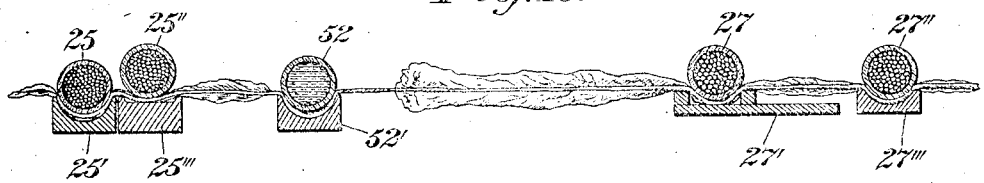
Figure 19:
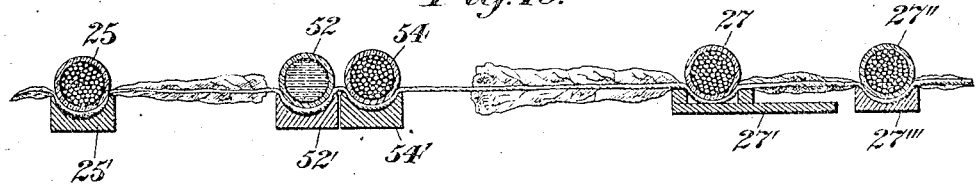
Figure 20:
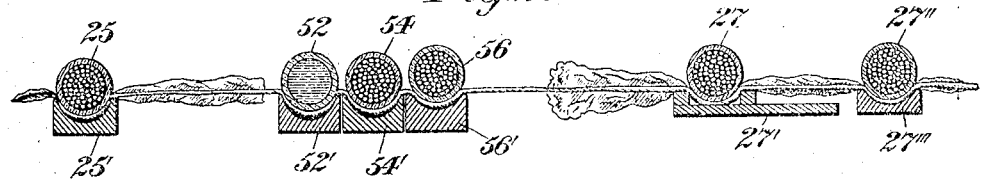

In the drawings accompanying and forming part of this specification, Figure 1 is a plan of a leaf-treating or leaf-stemming machine illustrating one embodiment of my present improvements. Fig. 2 is a side elevation of the same. Fig. 3 is an enlarged longitudinal sectional elevation of a portion of the same illustrating the blade-severing devices and also clamping means and a clearing device, the section being taken substantially in line 3—3, Fig. 1. Fig. 4 is an enlarged transverse sectional elevation, the section being taken substantially in line 4—4, Fig. 2, looking from the right in said view. Fig. 5 is an enlarged transverse sectional elevation of said machine, the section being taken substantially in line 4—4, Fig. 2, looking from the left in said view. Fig. 6 is a substantially central longitudinal sectional elevation of the machine, the section being taken in line 6—6, Fig. 1. Fig. 7 is a diagrammatic view illustrating the successive steps in the operation of feeding and treating the leaves. Fig. 8 is an enlarged view of a treated leaf with its severed parts assembled to illustrate the manner in which it is stemmed. Fig. 9 is an enlarged sectional detail illustrating my improved mercury-belt and its coöperating feed-belt. Fig. 10 is an enlarged end elevation illustrating two coöperating brushes of the improved type herein- before described for severing the veins of the leaves; and Fig. 11 is a side elevation of the same. Figs. 12 to 15, inclusive, are enlarged details illustrating the construction of the several puncturing-wheels. Figs. 16 and 17 are enlarged details illustrating the stem-severing device which I prefer to employ. Figs. 18 to 22, inclusive, are enlarged sectional details illustrating the manner in which and the extent to which a stem is regripped and retensioned at successive points during the stemming operation.

Similar characters of reference designate corresponding parts in the different figures of the drawings.

The framework of the machine may be of any construction suitable for supporting the several operative parts of the mechanism, it embodying in the present instance longitudinal beams, such as A, connected at intervals by cross-beams B, and supported by posts or uprights C. The several operative parts may be driven from any suitable source of power in any suitable manner, as, for instance, from a main driving-wheel D, carried by a shaft 2 journaled in suitable bearings, and having secured thereto a pair of smaller pulleys D' and D'', the former of which is connected by a driving-band 3 with a band-wheel D''', supported on a shaft 4 and also journaled in suitable bearings, while the pulley D'' carries a belt 5, suitably twisted around guide-rolls to drive a small pulley 6, carried by a shaft 7 journaled at one side of the machine, (see Fig. 1,) and operatively connected with different parts of the mechanism.

From the driving-pulley D''' the leaf-feeding means or belts are intended to be driven by suitable connections, such, for example, as those shown herein, and which embody in part a sprocket-chain 8 passing around corresponding sprocket-wheels 9 and 10, the former on the shaft 4 and the latter on a shaft 12, this shaft 12 also having a pinion forming part of a train of gearing, (designated in a general way by 13,) and adapted to drive at a much slower speed a shaft 14 carrying a sprocket-wheel 14', connected by a sprocket-chain 15 to a sprocket-wheel 16 supported on a stud 17, and secured to a pinion 16' in mesh with another pinion 18', carried by a shaft 18 journaled in bearings at the extreme right-hand end of the machine, (see Fig. 1,) and having secured thereto pulleys 18'' and a spur-gear 18''', this latter gear being in mesh, in this case, with a pinion 19' secured to a shaft 19, and carrying a presser-roll 19'' adapted to hold one of the re-gripping belts (indicated herein by 20) in engagement with the pulley 18''. The spur-gear 18''' also, in the construction shown, drives the conveyer or feed-belt which coöperates with the belt 20, movement being imparted in the present construction by a pinion 21' (see Fig. 2) suitably supported on a shaft 21 carrying a pulley (not shown) around which a belt (indicated by 20') passes and coöperates with the upper belt 20. At their inner ends the two belts 20 and 20' are suitably supported by rolls or pulleys 22 and 23. (See Fig. 2.)

In the present case it is intended to drive the main feed device or feed-belts from the shaft 14, which, in the construction illustrated, has thereon a large pulley or band-wheel 14", supporting, in this instance, a long and somewhat heavy conveyer or feed-belt 25', which extends to the extreme left-hand end of the machine, and is there carried around a large pulley 26' supported on a shaft 26 journaled in opposite sides of the frame. The belt 25', which is clearly shown in Fig. 6, constitutes the main conveyer or feed-belt for supporting and feeding the tip ends of the leaves to be treated, and said belt will preferably be a somewhat wide one having a plurality of longitudinal channels or grooves, see Fig. 1, in the leaf-gripping face thereof and extending entirely around the belt. One of these grooves may be considerably deeper than the other in order to obtain a firm grip upon the leaf-stem and bend the latter to a sufficient extent to assure the clamping of the leaf firmly in place during the feeding operation. The shaft 26 may also have thereon another large pulley, such as 26", around which may pass other conveyers or feed-belts, such as 27' and 27''', for gripping the opposite or butt ends of the leaves to be fed and treated, these belts being obviously positioned, in the preferred construction, in parallelism with the belt 25'. The belts 27' and 27''' are not, however, in this case quite as long as the belt 25', the former ending preferably at about the point where the last set of stemming devices of the main stemming-rolls begin to operate upon the leaf, and in the construction shown it will be seen that said belt 27' passes around a pulley 28', supported on a short shaft 28 suitably journaled in the framework. The belt 27''' is somewhat longer and does not release the butt of the leaf until the stemming has been almost finished. Said belt passes around a pulley 28''' carried by a stud 28''. As it is desirable to support each leaf at as many points in its length as may be necessary to assure the proper location thereof during its passage through the machine, the shaft 26 may also support other pulleys carrying additional feed-belts, such as 30' and 31', the former of which is carried around a pulley 32' on a shaft 32, while the latter passes to a large pulley 33', carried by a shaft 33 journaled at its opposite ends in opposite sides of the frame.

In all of the instances hereinbefore mentioned, and indeed in every case illustrated in the machine, the under feed-belt of each set of leaf-feeding conveyers constitutes the principal feed device of such set and does most of the work of feeding the leaf forward, the upper member or belt of each pair being intended principally as a means for holding the leaf in proper engagement with the lower feed-belt.

In the construction illustrated the shafts 26 and 32 may be connected by a heavy sprocket-chain, such as 35, passing around corresponding sprocket-wheels, and from the shaft 32, by a similar sprocket-chain 36 and a sprocket-wheel 32''', connection may be made to a shaft 37 at the under side of the machine, (see particularly Fig. 3,) and carrying a pinion 37' in mesh with a pair of spur-gears 38' and 39', the former of which is intended to transmit movement to the blade severing or puncturing devices, while the latter may be connected in a similar manner to impart movement to the first re-gripping device or belt and certain other parts.

In the construction illustrated the spur-gear 38' is carried by a shaft 38 having thereon a sprocket-wheel, (see Fig. 3,) around which passes a long sprocket-chain 40, which is carried, in this case, back and forth around sprocket-pinions of all of the blade-puncturing devices or wheels and the leaf-supporting members or disks coöperating with them; these parts being connected in this manner in order that they may rotate in unison exactly as if they were geared together by toothed-wheels. The manner in which these members are connected is clearly shown in Fig. 3, and it is believed need not be further described.

The number of upper feed-belts for pressing down the leaves on to the lower feed-belts or conveyers may, of course, be varied at will, but in this case I deem it desirable to employ four main, upper feed-belts and a number of auxiliary belts, some of which, of course, will be the ones for re-gripping the leaves. The four main, upper belts in this case are indicated by 25, 25'', 27 and 27'', the belts 25 and 25'' serving to hold down the tip end of the leaf and the belts 27 and 27'' to grip the butt end thereof, all of these belts being preferably rounded on their gripping faces in order to press the leaf into corresponding grooves in the under belts hereinbefore mentioned and thus crease and firmly grip the stems of the leaves. Another belt, preferably a short flat one, such as illustrated herein at 31, (see particularly Figs. 3 and 4,) may be supported on rollers, as at 41, 41' and 41'', journaled preferably in brackets carried by the framework, this belt serving to grip the leaves on belt 31' and hold them down firmly near the middle portions thereof during their passage between the members of the blade-severing devices. This belt may be considered as part of the main feeding means, as what I term the "re-gripping" of the leaf should not ordinarily take place until after the severing of the blade and the veins. Another and somewhat longer upper belt may also coöperate with the lower intermediate feed-belt 31', the other belt being indicated herein by 31'', and preferably having a round gripping face, as will be clear by referring particularly to Fig. 4, the lower belt 31' having in this instance a suitably-shaped, longitudinally-grooved channel into which the belt 31'' may dip to gain a firm hold upon the leaf and also properly tension the leaf and its stem before it is subjected to the action of the blade-severing and vein-severing media. This belt 31'' is clearly illustrated in detail in Fig. 9, and is intended to be weighted by means of some mobile medium, preferably a heavy fluid, such as mercury, and this feed device constitutes what I term a "mercury-belt", and is intended to clamp the leaf firmly at one side of the line of separation of the blade and veins during the severing of the latter. Preferably this belt will be a round one having a rubber leaf-engaging tread or face, and the belt will usually be tubular in order that only the lower or working run thereof need be filled with mercury, the upper run being thus left unweighted, as will be evident from Fig. 9, to prevent undue sagging of such run and possible injury to the belt. It will be apparent that any suitable means might be employed, however, for weighting the belt 31'', and indeed certain other belts illustrated in the drawings of the present application are weighted in a different manner, as by means of small shot freely movable in their tubular coverings. In the construction illustrated this mercury-belt is supported on suitable rolls or pulleys, such as 45, 46 and 47', the former being located immediately in the rear of the blade-severing devices for the upper run, the roll 46 being merely for supporting and guiding the upper run, and the roll 47' being carried by a shaft 47, (see Figs. 1 and 4,) supported in bearings in the upper longitudinal beams of this part of the framework. In order to assure the absolute timing of the movements of opposite ends of the long, upper, tip-gripping feed-belts 25 and 25'' I may also gear the shaft 48—carrying the pulleys supporting the left-hand ends of these upper feed-belts—directly to the shaft 32 supporting the pulleys for the lower feed-belts 25' and 25''', the connection illustrated herein being a spur-pinion 48'' on the shaft 48 and a spur-gear 32'' on the shaft 32. (See Figs. 1 and 4.)

As before stated, the spur-gear 39' (shown most clearly in Fig. 3) is carried by a shaft supporting a sprocket-wheel around which passes a sprocket-chain adapted to drive certain parts of the re-gripping means, and it will be seen in this case that said sprocket-chain, which is indicated by 50, passes around a sprocket-pinion carried by a shaft 51 journaled in suitable bearings and supporting a pulley 51', carrying the rear or initial end of the first re-gripping belt that clamps the leaf or its stem after the blade portions and veins thereof have been severed.

The first re-gripping belt which engages a leaf after its blade and veins have been severed is indicated herein by 52 and may be a mercury-belt substantially of the same construction as the belt 31''. This re-gripping-belt coöperates with a corresponding or complementary, lower feed-belt, such as 52', which may have in the face thereof a channel into which the working-face of the belt 52 may fit to tension the leaf in the line of separation of the blade and veins, while the leaf is held at points at opposite sides of the re-gripping belt. The belt 52' is supported at its rear or initial end by a pulley or roll, such as 53, which may be mounted in brackets carried by the framework, while at the forward end thereof said belt may be supported by a pulley 21'' on the shaft 21. Further on in the travel of the leaf through the machine it may be engaged by another re-gripping device or belt, such as 54, the rear or initial end of which may be carried by a pulley supported on a shaft 55, (see Fig. 1,) which is driven from the shaft 51 by the sprocket-chain 50. This upper, re-gripping belt 54 may terminate, or have its extreme forward end, at the same point as the first re-gripping belt 52, and a third, comparatively short, upper, re-gripping belt 56 may also be employed and may also terminate at the same point as the two just described, all of these belts in the construction shown passing at such point around a pulley or pulleys carried by a bracket 57. The second, upper, re-gripping belt 54 coöperates with a corresponding lower re-gripping belt 54', suitably supported at its rear end and carried at its forward end around a pulley, such as 21'' on the shaft 21. The third, re-gripping belt 56 should, of course, coöperate with a lower belt 56', (see Fig. 20,) suitably supported and driven. The fourth, re-gripping belt 20 has been hereinbefore described and also its coöperating lower belt 20. Both of these may be flat belts if desired, and the manner in which they are supported and coöperate with each other will be apparent by referring to Figs. 1 and 2, the lower belt being carried by the roll 23. A fifth re-gripping belt—such as 20''—may also be used, with which a lower belt—such as 20'''—should, of course, coöperate.

As before stated, the belt 25'' coöperates with the lower, grooved belt 25''', but the latter does not extend toward the forward end of the machine as far as the upper belt 25'', and hence I have illustrated herein at 25$^a$ a short lower belt, which passes around a pair of pulleys suitably supported on shafts carried by the framework, (see Fig. 6,) this short belt being constructed in substantially the same manner as the belt 25''' and coöperating with the upper belt 25'' in substantially the same way. The rear pulley carrying this short belt is indicated herein at 60' (see Figs. 5 and 6) and is secured to a shaft 60 having thereon a sprocket-wheel 60'' around which passes a sprocket-chain 61 from a sprocket-pinion carried by the shaft 37. (See Figs. 3 and 6.)

Figure 21:
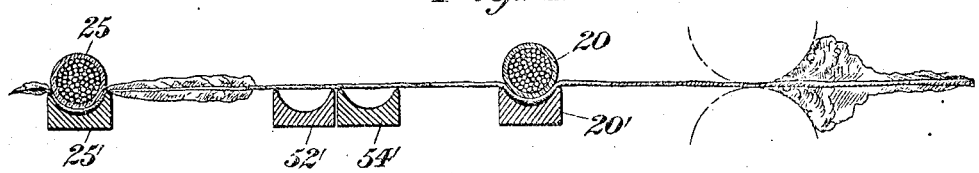
Figure 22:
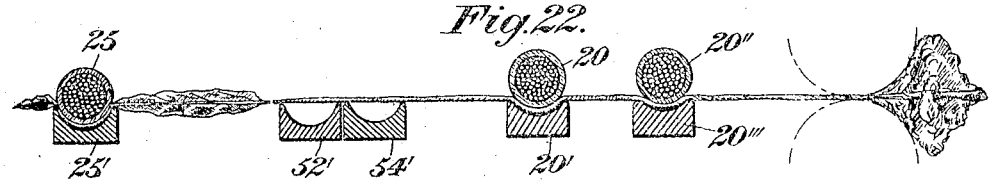

The manner in which the leaf-stem is regripped and retensioned at different points during the stemming operation is clearly shown in detail, on an enlarged scale, in Figs. 18 to 22, inclusive, from which the operation of the differential-tensioning devices or belts will be obvious. Here all of the upper regripping-belts may be substantially similar in construction, but the lower belts, in the grooves of which the upper belts are intended to lie, will ordinarily be grooved to different depths in order that the leaf-stems may be stretched by different amounts at different points during the stemming operation. The first lower regripping-belt, 52', in this case has a groove of considerable depth, as there is the greatest amount of slack to be taken up immediately after the puncturing-wheels and the vein-breaking brushes have operated upon the leaf. Hence the use of the tensioning-belt at this time, which has a deep groove such as that indicated in the belt 52'. After the first pair of stemming-rolls has operated upon the leaf to partially stem the latter of course the stem will be still further stretched by the pull of said rolls, but not to so great an extent as by the action of the puncturing-wheels and the vein-breaking brushes. Hence the groove in the lower second re-tensioning-belt, 54', need not be so deep as that in the belt 52', there being less slack to be taken up in the stem than in the first case, and it being necessary to proportion the depth of the groove to tension the stem by a less amount than in the first case. The pull upon the stem during the time that the second pair of stemming-rolls is in operation is such as to result in stretching such stem to an additional extent, and after passing said second pair of rolls this slack should be taken up by a third re-tensioning device, the lower belt 56' of which may be grooved still less than the belt 54', as there will be less slack in the stem to be taken up by the belts 56 and 56'. While the leaf is being stemmed by the final pair of long stemming-rolls it may be regripped by a fourth tensioning device, the lower belt 20' of which may have a deeper groove therein than the belt 56' in order that a strong grip may be taken upon the tough portion of the stem nearer the butt as that portion of the stem which is nearer the tip is released by the first three pairs of regripping and re-tensioning devices. At another point, before the stemming operation is completed, still another pair of re-tensioning devices may grip the leaf-stem, and the groove in the lower belt, 20''', of this pair may be somewhat shallower than that in the belt 20' of the fourth pair of regripping devices, which will at this time also be in engagement with the stem. As will be evident the object of regripping the stem at different points in the direction of the stemming operation, and of re-tensioning such stem by varying amounts at such points, is to obtain a hold upon the stem as close as possible to the point where the stemming-rolls are operating, and to also maintain the stem taut at such times. The only way in which this can be done, so far as I am now aware, is to regrip and re-tension at different points in the length of the stem in the direction in which the blade portions are stripped therefrom, and by the use of differential-tensioning devices so proportioned or adjusted as to take up the varying amount of slack, which must be gotten rid of in order to enable the stemming-rolls to operate properly, which they cannot do if there is much slack in the stem. Of course during the first part of the stemming operation when the stemming-rolls are operating upon the tip end of the leaf and pull upon the tender portion of the stem the latter will be stretched more than when such rolls are working upon the leaf near the thicker and tougher portions of the stem, and therefore the stem will be stretched more during the initial stages of the stemming operation than during the middle and latter parts thereof, and in order to obtain the best results the re-tensioning devices must be so proportioned or adjusted as to exert differential or varying tensioning actions upon the stem, and hence tension such stem by different amounts, and at the same time grip or tension the stem nearer and nearer to the butt-end of the stem. It should be noted here that when the butt-end of the stem is released by the belts 27 and 27'' during the latter part of the stemming operation it will not be necessary to take up slack from end to end of the leaf, but that if the leaf is held at one point near its center, as shown in Fig. 21, this will be sufficient, as the stemming-rolls will then be working upon the free end of the stem—the strong butt portion thereof—and hence no tensioning of the leaf between the belt 20 and the belt 25 will be necessary, as the pull of the stemming-rolls will not be exerted to any appreciable extent beyond the belt 20. Hence at this time, as the stemming-rolls are working upon the free end of the leaf and drawing taut that portion between the butt and the belt 20, it is immaterial whether there is slack in the leaf between the belt 20 and the belt 25; but for the purpose of obtaining a stronger hold upon the stem during the last stages of the stemming operation it will be found advantageous to regrip the stem by means of the belt 20'' as the force exerted at this time is the maximum employed, and an additional grip upon a stem is desirable as a matter of precaution in order to prevent slipping of the leaf endwise.

All of these various feed-belts or conveyers just described are connected by the driving mechanism, as will be apparent, to operate in proper timing, the connections practically throughout being practically timed gearing of some kind. Not all of these feed-belts need be of the same construction, however, although all of them coöperate to hold or engage the leaves during the treatment of the latter. Most of the pairs of belts are constructed to crease some portion of the leaf or its stem, some of them engaging the tip in this manner, some the butt, and others different or successive points between the tip and the butt, most of these intermediate gripping devices constituting members of the re-gripping means, and some of them being the tensioning and retensioning devices for drawing a leaf taut after it has been stretched.

In the present construction the blade-severing means will be the first to treat the leaf, and this will now be described. As before stated all of the different blade-severing devices and coöperating members may be rotated in unison by the sprocket-chain 40 and they are so shown. In the preferred construction I make use of a plurality of blade-puncturing devices for severing the blade portions of the leaves, and these devices will be substantially of the same type as those shown and described in my prior patent hereinbefore referred to, but in this case the several devices will be organized and will coöperate in a different manner. Here I have illustrated two series or sets of such blade severing or puncturing devices, one series at each side of the path of the leaf to be treated, and in operation they will preferably alternate with one another, that is to say, a puncturing device of one series will first puncture the leaf, then a puncturing device of the other series, and so on in proper order. As it is desirable, for the purpose of thoroughly separating the blade from the stem and veins along any given line, to puncture the blade portions with incisions of different lengths, or at different points in the line of separation, I prefer to employ a plurality of blade-severing devices of different efficiencies, these being usually successively operative, the first making incisions of a given length or at given points in the blade of the leaf, while a succeeding puncturing device or devices will make incisions of greater length or else perforate at different points in such line. In this case I have shown three puncturing devices in each series, and corresponding puncturing devices on opposite sides of the path of the leaf may be substantially similar to each other. The devices of the upper row are designated by $b$, $b'$, and $b''$, respectively, while those of the lower set are indicated by $p$, $p'$, and $p''$. All of these blade severing or puncturing devices are rotatable as before stated and will usually have yielding, puncturing members with substantially spear-shaped heads of the type described in my aforesaid, prior patent. The puncturing members or blades of the puncturing-wheels $b$ and $p$ may be of the same size, those of the wheels $b'$ and $p'$ may be of the same or a larger size, while the puncturing-wheels $b''$ and $p''$ may have like puncturing-blades or spear-heads of greater cross-sectional length in the direction in which the wheels rotate than those of the other puncturing-wheels.

In the present case I have illustrated in detail in Figs. 12 to 15, inclusive, the construction of the puncturing-wheels $b$, $b'$, and $b''$, said wheels being carried in this case by shafts 100, 100', and 100'', which, it should be understood, will be supported by suitable bearings on the framework. Each of these puncturing-wheels will have a hub or body portion, such as 101, secured to its shaft in some suitable manner, and it will also have a circuit of puncturing members or blades. In the present case each puncturing member embodies a shank or stem, such as 102, the inner end of which may be secured in a notch in the hub 101, and may be held in place in any suitable manner—as, by means of cement. These shank portions of the puncturing members are preferably flat strips of metal, which will yield readily in the direction of rotation of the puncturing-wheel, and at the outer end thereof each shank may carry a puncturing-head, preferably arrow-shaped, as shown at 103, the flat portions of the head and the shank lying in planes perpendicular to each other. Substantially the only difference in the wheels $b$, $b'$, and $b''$ is that the shanks 102 are spaced nearer together than the shanks 102', while the shanks 102'' are spaced still farther apart than those shown at 102', and that the perforating members or spear-heads 103 will make shorter perforations than the spear-heads 103', while the spear-heads 103'', being still larger, will make longer perforations than the spear-heads 103'. The result of this is that in operation all of the spear-heads will yield if they strike the stem or the veins, and the incision in the blade portion of the leaf will be made gradually as the different sizes of spear-heads come into action, thus avoiding the danger of wasting the stock by tearing or breaking the blade of the leaf improperly.

In order that the leaves may be properly supported during the action of any puncturing-wheel thereon, I prefer to provide in connection with these wheels a plurality of rotary leaf supporting devices all of which may be of the same construction, these devices being indicated in a general way by s. Each may embody a pair of disks of the same diameter supported at opposite sides of the plane of rotation of the puncturing-wheel, these disks being preferably milled and placed close together. One of these devices will be disposed opposite each puncturing-wheel, and they may be rotated in the same manner as the puncturing-wheels, and by the same sprocket-chain 40.

In connection with the devices just described I prefer to employ means for securely clamping the leaf in place, especially during the early stages of the blade-severing operation. This clamping means may be of any type suitable for the purpose and may coöperate with the leaf-holding-and-feeding means at any point in the length of the stem, but preferably near the butt, and in the construction shown this clamping device, which is illustrated clearly in detail in Fig. 3, may engage the inner sides of the leaf-holding runs of the feed-belts 31 and 31', while the mercury-belt 31'' will, of course, materially increase the effectiveness of the leaf-holding and clamping means. This clamping means may be of any construction suitable for the purpose, but preferably will embody one or more clamping members, usually clamping frames, such as f and f', the upper one at least of which should have its clamping-face formed of a series of small rolls which will turn freely as the leaf-feeding belts advance. In this case each of the frames f and f' has a series of such rolls, those of the upper frame being indicated by 65, while those of the lower frame are designated by 65'. In order to increase the clamping effect of the clamping member or frame f, I deem it advantageous to mount this so that it will be capable of yielding but will still be tensioned, and for this reason I prefer to make this frame member f of such size that it can be weighted heavily and exert a considerable pressure upon the working run of the belt 31. In this case this gravitative, clamping member is connected to a suitable portion of the frame by links, such as 66, and its weight will keep it down in close contact with the belt and will assure the proper clamping of the leaves to be treated.

I have stated hereinbefore that not only may the blade-severing devices be of different efficiencies as blade-severing media, but that the vein-severing device should be of greater efficiency than the blade-severing devices and should be capable of exerting a force or stress sufficient to disrupt or break the veins. Any vein-severing device operative in this manner may be employed and is within the scope of my present invention, but I prefer to make use of a vein-severing device of the type shown herein and illustrated clearly in Figs. 3, 4, 10, and 11. In this construction two rotary, intermeshing, vein-parting members or brushes are illustrated, and these brushes, which are indicated by v and v', may be mounted for rotation in suitable brackets, such as 71 and 71', properly supported by the framing. These brushes may be driven from the side shaft 7 by a pair of sprocket-chains, such as 72 and 72', passing around sprocket-pinions on the shaft 7 and over suitable pairs of guide-sprockets, such as 73 and 73', (see Figs. 3 and 4,) two short shafts, such as 75 and 75', each carrying sprocket-wheels, also having spur-gears 76 and 76', meshing with corresponding pinions 77 and 77' secured to shafts carrying the brushes v and v'.

As before pointed out, I prefer to employ as the vein-severing devices coöperating intermeshing brushes of novel construction. Each of these brushes, in the preferred construction, has a circuit of vein-severing elements of different efficiencies as vein-breaking media, and here I have shown two alternating rows of brush-tufts 78 of considerable flexibility and rigid members 79, which may be of any proper material and shape, but in this case are round-faced metallic staples. In assembling the brushes care should be taken to have the vein-breaking members properly disposed relatively to each other with the staples opposite the brush-tufts throughout, (see Fig. 10,) and hence the brush-tufts and the rigid members or staples should be regularly spaced, the same interval being preserved preferably throughout the peripheries of both brushes. Coacting brushes of this construction have been found in practice to operate with a high degree of efficiency and exert a stress or pull upon the veins of a leaf sufficient to sever such veins, but are not sufficiently powerful to break the leaf-stems. They, therefore, are of a higher degree of efficiency as severing media than the puncturing-wheels, but are not as effective for this purpose as the device (hereinafter to be mentioned) which I will usually employ for severing the stem near the close of the treatment of the leaf. These vein-severing brushes should be so located as to break the veins in the line of separation of the leaf by the puncturing-wheels, and hence are in alinement with the latter. They also serve as a means for effecting a slight or preliminary stripping of the leaf, the faces of coacting elements being usually of such widths as not only to break the veins, but also to brush back the blade portions of the leaf from the stem for a short distance in the direction of the stemming operation. After the veins of the leaf have been severed, and just before the leaf is engaged by the re-gripping belt 52, the blade portions of the leaf may be forced out of the way in the direction in which the leaf is stemmed by a clearing device, which may be a narrow brush, such as 80, rotated in any suitable manner, as, for example, from the upper vein-severing brush $v$, said clearing brush being connected in this case to the shaft of the brush $v$ by a shaft 81 having therein one or more universal joints. The clearing brush 80 will force the blade of the leaf back slightly just before the bare portion of the stem is engaged by the re-gripping belts 52 and 52', and will prevent the engagement of the blade portions between such belts. As soon as the leaf passes between these belts 52 and 52' it is, of course, tensioned by the creasing of the leaf-stem between the round-faced mercury-belt 52 and the concave groove in the working face of the belt 52' and any slack in the leaf and its stem, due to the stretching of the latter by the blade-severing and vein-severing means, will be taken up and the leaf will be drawn and held taut for further treatment. Soon after the leaf is engaged by these re-gripping belts it arrives at a point where it may be operated upon by the stemming means proper. The stemming means may be of any suitable type, but, as before stated, brushes of the type shown at $v$ and $v'$ may be employed, and I prefer to use them for the purpose. In the present construction the stemming means embodies a plurality of successively-effective stemming devices disposed at different angles to the path of feed of the leaf from that occupied by the vein-severing devices, and usually these stemming devices will be disposed at successively-steeper angles to such path. Three of these stemming devices are illustrated in the drawings of this application, the first of them being designated in a general way by S, the second by S', and the third by S''. The stemming devices S and S' are of substantially the same construction and substantially similar to the vein-stemming devices, but the brushes are of different lengths, those of the stemming device S' being somewhat longer than those of the stemming device S. Moreover, these two stemming devices will usually be disposed at different angles to the path of the leaf and in different positions in the length of the stem, the stemming device S' working nearer the butt end of the leaf than the preceding stemming device, while the stemming device S'' works still farther toward the extreme butt end of the leaf and its stem.

The angles at which the brushes of the several stemming devices are disposed relatively to the line of feed of the leaf will be such as to assure the stemming of the leaf to the best advantage without imposing thereupon any undue strain, especially during the early stages of the stemming. Hence the angles at which these stemming devices are placed will vary but slightly, as the force exerted by the stemming-rolls should increase gradually and not violently as would be the case if the angle of the stemming-rolls S' relative to the line of feed were very much greater than that of the stemming-rolls S, or if the angle of the third set of rolls S'' were very much greater than that of the second set S'.

The manner in which I prefer to mount and drive the several stemming devices is clearly shown in Fig. 5, from which it will be seen that the coacting brushes 90 and 90' of the stemming device S and 91 and 91' of the stemming device S' may be mounted on shafts carried in brackets in substantially the same manner as the brushes $v$ and $v'$, and that they may be driven in substantially the same way, that is, by pinions on the brush-shafts meshing with the gears on shafts 92 and 92' and 93 and 93', these shafts carrying sprocket-wheels around which pass sprocket-chains, such as 95 and 95' and 96 and 96', to the side shaft 7, it being understood, of course, that said chain will be carried around suitable sprocket-pinions on such side-shaft and also around corresponding guide-sprockets or sprocket-wheels on the framework, these latter being clearly illustrated in Figs. 5 and 6 and being substantially similar to those described with reference to the vein-severing device.

Before the leaf reaches the second stemming device S' it may be re-gripped by the second set of re-gripping devices or belts, and before reaching the last or principal stemming device S'' the leaf may again be gripped by the third pair of re-gripping belts, while during its treatment by the stemming device S'', and before the stemming is completed, the stem may be re-gripped by the fourth and fifth sets of re-gripping belts 20, 20', 20'', and 20'''. The stemming device S'' is substantially similar to the others, except that the brushes are preferably very much longer, as shown at 97 and 98, and may be disposed to advantage at a somewhat steeper angle to the path of feed of the leaf, as these rolls strip the leaf near the butt thereof, which is much stronger than at points near the tip and center, and the leaf need not, therefore, be so carefully handled at this stage of its treatment. This positioning of the several stemming devices at successively-increasing angles also permits the construction of a machine somewhat shorter than would otherwise be the case. The two brushes 97 and 98 are suitably supported for rotation; and their shafts are preferably directly connected by a pair of pinions 97' and 98' for rotation in unison. These two rolls may be driven from an independent source of power if desired, and at a higher rate of speed, and for this purpose the shaft 97'' of the upper roll has thereon a band-wheel 100.

At some suitable point, such as that indicated in Figs. 1 and 7, a stem severing or cutting device—such as a rotary knife $k$—may be placed and driven in any desired manner in order to part the unstemmed tip end of the leaf from the stem and the butt. In this case the knife $k$ coacts with the roll $k'$ with which it is in contact, the knife and the roll, which will usually be wood, being rotated by the stem as the leaf is fed through the machine, and serving to cut such stem during its passage therebetween, as will be readily understood by reference to Figs. 16 and 17.

The operation of a machine constructed in accordance with my present improvements as illustrated in the embodiment thereof shown in the drawings of this application will be readily understood from the foregoing description, but may be briefly stated as follows, reference being had particularly to Fig. 7: Leaves are fed into the machine in any suitable manner at the left-hand end thereof, and each leaf will be carried forward on the stemming and feeding conveyers or belts for supporting the tip, the butt, and an intermediate portion thereof, and will be carried along until the tip end passes under the weighted feed-belts 25 and 25", when the tip will be creased between the opposing convex and concave faces of the belts and will be clamped firmly in place. Shortly after this, and before it reaches the blade-severing devices, the butt end of the leaf will be engaged and creased in a similar manner by the belts 27, 27', 27", and 27''' and immediately thereafter an intermediate portion of the leaf at that side thereof between the blade-severing devices and the butt-gripping belts may be similarly engaged by the intermediate belts 31' and 31''', as well as by the short belt 31 and the mercury-belt 31", the clamping members $f$ and $f'$ also pressing the leaf tightly in place at this time. As the leaf is carried forward it is, of course, punctured by the successive wheels $p$, $b$, $p'$, $b'$, $p''$, and $b''$ in that order, and when it emerges from under the last puncturing-wheel there will be a well defined line of separation extending entirely across the leaf, except where the veins and stem still remain intact. On passing the blade-severing means the vein-severing device will come into action and will sever the veins by exerting thereon a stress or pull of sufficient force to break the same, and simultaneously the blade portions of the leaf will be brushed back along the stem in the direction of the stemming operation to leave a wide path of separation extending entirely across the leaf, except where the stem still remains unbroken. After passing the vein-severing device, and just before being engaged by the first re-gripping belts, the clearing brush 80 will come into action and brush back the blade portions of the leaf out of the path of the re-gripping belts, and the latter will engage the stem at that portion thereof which has been laid bare, and especially the part most nearly adjacent to the rough, cut edge of the tip, which is the point in the stem most liable to be stretched or weakened by the blade-severing and vein-breaking devices. On passing between the first re-gripping belts 52 and 52', the stem will be tensioned and re-gripped, and soon after the intermediate portion of the stem will be released by the belts 31' and 31", and the short belt 25$^a$ in alinement with the belt 25" will reëngage the tip of the leaf. That portion of the leaf between the line of separation and the point at which the butt is gripped is now released and may be operated upon, but it is tensioned by the re-gripping belts 52 and 52' and in condition to be properly stemmed by the stemming rolls or brushes S. These rolls brush the blade portions off from the stem and partially stem the leaf, and thereafter, and before the leaf is treated by the stemming device S', the stem is re-gripped closer to the butt by the second re-gripping and re-tensioning belts 54 and 54', which will, of course, draw the stem taut again and compensate for any additional stretching to which it may have been subjected. The rolls of the stemming device S' now operate to stem the leaf to a point nearer to the butt, and the operation is somewhat quicker than the first one on account of the steeper angle at which the rolls are disposed with reference to the path of feed of the leaf; but before this stemming action has been completed the tip of the leaf may be partially released by passing from under the short belt 25$^a$. After passing the stemming device S', the stem may be again re-gripped and re-tensioned by the third pair of re-gripping belts, the upper one of which is indicated at 56 at a point still nearer to the butt of the leaf, and shortly afterward the leaf will be in position to be operated upon by the final or principal stemming device S". These stemming-rolls may have a still higher efficiency as stemming media, this result being obtained either by placing the rolls at a steeper angle to the line of feed of the leaf, or by rotating them more rapidly, or by both; but before the leaf has been stemmed very far by these rolls the leaf will pass beyond the belts 27 and 27' and afterward beyond the belts 27" and 27''' and leave the stem free to be treated all the way to the butt thereof. Immediately after this the stem may be re-gripped and re-tensioned for the fourth time by the re-gripping belts 20 and 20', and afterward by the final re-gripping belts 20" and 20''', and while the stems are held by these belts, the blade-portions of the leaf may be brushed clear of the stem and the stem severed from the unstemmed tip of the leaf by the stem-severing device or knife $k$, after which this unstemmed tip will pass beyond the gripping-belts 25 and 25' and will fall to one side of the machine, while the stemmed main portions of the blade will fall at the other side of the machine; and the stem itself be carried on to the extreme forward end of such machine by the belts 20.

20′, 20″, and 20‴. Fig. 8 illustrates the number of parts into which a leaf is divided by this treatment, and the manner in which such division is effected.

Having thus described my invention, I claim—

1. Leaf-treating mechanism embodying leaf-stemming means operative for stemming the leaf away from the point at which it is reëngaged by the leaf-holding means, and changeable-grip leaf-holding means coacting therewith and operative first for holding the leaf at one point in the length thereof, and afterward for reëngaging the leaf close to the leaf-stemming means and in the rear of, and during, the stemming operation while said leaf is held at one point.

2. Leaf-treating mechanism embodying leaf-stemming means operative for stemming a leaf away from the point at which it is reëngaged by the stem-holding means, and changeable-grip stem-holding means coacting therewith and operative first for holding the stem at one point in the length thereof, and afterward for reëngaging the stem close to the leaf-stemming means and in the rear of, and during, the stemming operation while said stem is held at one point.

3. Leaf-treating mechanism embodying leaf-stemming means operative for stemming a leaf away from the point at which it is reëngaged by the stem-holding means, and stem-holding means having successively-effective holding elements one for holding the stem at one point in the length thereof and the other for reëngaging said stem at another point close to the leaf-stemming means and in the rear of, and during, the stemming operation while the stem is held at the first point.

4. Leaf-treating mechanism embodying leaf-stemming means operative for stemming a leaf away from the point at which it is re-gripped by the stem-gripping means, and stem-gripping means having successively-effective gripping faces one for gripping the stem at one point in the length thereof and the other for regripping said stem at another point close to the leaf-stemming means and in the rear of, and during, the stemming operation while the stem is held at the first point.

5. Leaf-treating mechanism embodying leaf-stemming means operative for stemming a leaf away from the point at which the re-gripping device is effective; a leaf-feeding stem-gripping device operative at one point in the length of the stem; and a regripping device operative at another point in the length of such stem close to the leaf-stemming means, and effective in the rear of, and during, the stemming operation while such stem is held at the first point.

6. Leaf-treating mechanism embodying leaf-stemming means operative for stemming a leaf away from the point at which the re-gripping device is effective, and successively-effective stem-gripping and stem-regripping leaf-feeding devices one operative for gripping the stem at one point in the length thereof and the other for regripping said stem at another point close to the leaf-stemming means and in the rear of, and during, the stemming operation while the stem is held at the first point.

7. Leaf-treating mechanism embodying leaf-stemming means operative for stemming a leaf away from the points at which the re-gripping devices are effective, and also embodying the following devices successively effective at different points in the length of a leaf—viz., a leaf-gripping device, and a plurality of regripping devices operative close to the leaf-stemming means and each effective in the rear of, and during, the stemming operation while the stem is held at one point.

8. Leaf-treating mechanism embodying leaf-stemming means operative for stemming a leaf away from the points at which the re-gripping devices are effective, and also embodying the following devices successively effective at successive points in the length of a leaf in the direction in which it is stemmed—viz., a leaf-gripping device, and a plurality of regripping devices operative close to the leaf-stemming means and each effective in the rear of, and during, the stemming operation while the stem is held at one point.

9. Leaf-treating mechanism embodying leaf-stemming means operative for stemming a leaf away from the points at which the re-gripping devices are effective; a leaf-feeding stem-gripping device operative at one point in the length of the stem; and successively-effective regripping devices operative at other points in the length of such stem close to the leaf-stemming means, and effective in the rear of, and during, the stemming operation.

10. Leaf-treating mechanism embodying leaf-stemming means operative for stemming a leaf away from the points at which the regripping devices are effective; a leaf-feeding stem-gripping device operative at one point in the length of the stem; and successively-effective leaf-feeding regripping devices operative at other points in the length of such stem close to the leaf-stemming means, and effective in the rear of, and during, the stemming operation.

11. Leaf-treating mechanism embodying leaf-stemming means operative for stemming a leaf away from the point at which the re-gripping device is effective; and also embodying successively-effective parallel stem-gripping and stem-regripping leaf-feeding devices, the former operative at one point in the length of the stem, and the other operative at another point close to the leaf-stemming means and effective in the rear of, and during, the stemming operation while the stem is held at the first point.

12. Leaf-treating mechanism embodying leaf-stemming means operative for stemming a leaf away from the point at which the regripping-conveyer is effective, and also embodying successively-effective parallel endless stem-gripping and stem-regripping leaf-feeding conveyers, the former operative at one point in the length of the stem, and the latter operative at another point close to the leaf-stemming means and effective in the rear of, and during, the stemming operation while the stem is held at the first point.

13. Leaf-treating mechanism embodying leaf-stemming means operative for stemming a leaf away from the point at which the regripping-belt is effective, and also embodying successively-effective parallel endless stem-gripping and stem-regripping leaf-feeding belts, the former operative at one point in the length of the stem, and the latter operative at another point close to the leaf-stemming means and effective in the rear of, and during, the stemming operation while the stem is held at the first point.

14. Leaf-treating mechanism embodying leaf-stemming means operative for stemming a leaf away from the points at which the regripping-belts are effective, and also embodying successively-effective parallel pairs of endless stem-gripping and stem-regripping leaf-feeding belts, the former pair operative at one point in the length of the stem, and the latter operative at another point close to the leaf-stemming means and effective in the rear of, and during, the stemming operation while the stem is held at the first point.

15. Leaf-treating mechanism embodying leaf-stemming means operative for stemming a leaf away from the point at which the regripping device is effective; tip-gripping and butt-gripping leaf-feeding devices; and a regripping device operative at a point between such first-mentioned devices and close to the leaf-stemming means, and effective in the rear of, and during, the stemming operation while the leaf is held by at least one of said first-mentioned devices.

16. Leaf-treating mechanism embodying leaf-stemming means operative for stemming a leaf away from the points at which the regripping devices are effective; tip-gripping and butt-gripping leaf-feeding devices; and successively-effective regripping devices operative between such first-mentioned devices and effective at successive points from the tip toward the butt in the rear of, and during, the stemming operation.

17. In leaf-treating mechanism, the combination, with blade-severing means, and with leaf-stemming means operative for stemming the leaf away from the point at which it is reëngaged by the stem-gripping means, of changeable-grip stem-gripping means operative first for holding the stem at one point in the length thereof, and then operative for holding the stem at another point in the length thereof close to the leaf-stemming means and in the line of separation of the blade and in the rear of, and during, the stemming operation while the stem is held at one point.

18. In leaf-treating mechanism, the combination, with separate blade-severing and vein-severing devices, and with leaf-stemming means operative for stemming a leaf away from the point at which it is reëngaged by the stem-gripping means, of changeable-grip stem-gripping means operative first for holding the stem at one point in the length thereof, and then operative for holding the stem at another point in the length thereof close to the leaf-stemming means and in the line of separation of the blade and in the rear of, and during, the stemming operation while the stem is held at one point.

19. In leaf-treating mechanism, the combination, with successively-effective blade-severing and vein-severing devices, and with leaf-stemming means operative for stemming a leaf away from the point at which it is reëngaged by the stem-gripping means, of changeable-grip stem-gripping means operative first for holding the stem at one point in the length thereof and then operative for holding the stem at another point in the length thereof close to the leaf-stemming means and in the line of separation of the blade and in the rear of, and during, the stemming operation while the stem is held at one point.

20. In leaf-treating mechanism, the combination, with leaf-feeding and stem-gripping means, of leaf-stemming means operative for stemming a leaf away from the point at which the regripping device is effective, and successively-effective alined blade-severing and regripping devices, the latter operative close to the leaf-stemming means and effective in the rear of, and during, the stemming operation while the stem is held at one point.

21. In leaf-treating mechanism, the combination, with leaf-feeding and stem-gripping means, of leaf-stemming means operative for stemming a leaf away from the point at which the regripping device is effective, and successively-effective alined blade-severing, vein-severing, and regripping devices, the latter operative close to the leaf-stemming means and effective in the rear of, and during, the stemming operation while the stem is held at one point.

22. In leaf-treating mechanism, the combination, with leaf-feeding and stem-gripping means, and with leaf-stemming means operative for stemming a leaf away from the point at which the regripping device is effective, of the following alined devices successively effective in the order named—viz., blade-severing means, and a leaf-feeding regripping device operative close to the leaf-stemming means and effective in the rear of, and during, the stemming operation while the stem is held at one point.

23. In leaf-treating mechanism, the combination, with leaf-feeding and stem-gripping means, and with leaf-stemming means operative for stemming a leaf away from the point at which the regripping device is effective, of the following alined devices successively effective in the order named—viz., a plurality of differential blade-puncturing devices, a vein-severing device, and a leaf-feeding regripping device operative close to the leaf-stemming means and effective in the rear of, and during, the stemming operation while the stem is held at one point.

24. In leaf-treating mechanism, the combination, with leaf-holding means, and with leaf-stemming means operative for stemming a leaf away from the point at which the tensioning device is effective, of a leaf-tensioning device effective in the rear of, and during, the stemming operation while the stem is held at one point.

25. In leaf-treating mechanism, the combination, with leaf-holding means effective at separated points in the length of a leaf, and with leaf-stemming means operative for stemming a leaf away from the point at which the tensioning device is effective, of a leaf-tensioning device operative for tensioning a leaf between such points and effective in the rear of, and during, the stemming operation while the stem is held at one point.

26. In leaf-treating mechanism, the combination, with stem-gripping means effective at separated points in the length of a stem, and with leaf-stemming means operative for stemming a leaf away from the point at which the tension device is effective, of a stem-gripping tension device disposed between such points and effective in the rear of, and during, the stemming operation while the stem is held at one point.

27. In leaf-treating mechanism, the combination, with stem-gripping means effective at separated points in the length of a leaf, and with leaf-stemming means, of separate stem-gripping tension devices disposed between such points and coöperative with the leaf-stemming means and adapted to exert two separate tensioning actions upon the leaf during the stemming operation while the stem is held at one point.

28. In leaf-treating mechanism, the combination, with stem-gripping means effective at separate points in the length of the leaf, and with leaf-stemming means, of successively-effective stem-gripping tension devices disposed between such points and coöperative with the leaf-stemming means and adapted to exert two successive tensioning actions upon the leaf during the stemming operation while the stem is held at one point.

29. The combination, with leaf-stemming means operative for stemming a leaf away from the point at which the leaf-tensioning device is effective, of leaf-feeding mechanism embodying the following devices effective in the order named during the feeding of a leaf—viz., leaf-holding means, and a leaf-tensioning device effective in the rear of, and during, the stemming operation while the stem is held at one point.

30. The combination, with leaf-stemming means, of leaf-feeding mechanism embodying the following devices successively effective in the order named during the feeding of a leaf—viz., leaf-holding means, a leaf-tensioning device, and a retensioning device coöperative with the leaf-stemming means during the stemming operation while the stem is held at one point.

31. The combination, with leaf-stemming means operative for stemming a leaf away from the point at which the regripping device is effective, of leaf-feeding mechanism embodying the following devices successively effective in the order named—viz., stem-gripping leaf-feeding means, and a regripping leaf-tensioning device effective in the rear of, and during, the stemming operation while the stem is held at one point.

32. The combination, with leaf-stemming means operative for stemming a leaf away from the point at which the regripping device is effective, of leaf-feeding mechanism embodying the following devices successively effective in the order named—viz., stem-gripping leaf-feeding means, and a regripping leaf-feeding-and-tensioning device effective in the rear of, and during, the stemming operation while the stem is held at one point.

33. In leaf-treating mechanism, the combination, with leaf-holding means, and with leaf-stemming means operative for stemming a leaf away from the point at which the tension device is effective, of a leaf-bending tension device effective in the rear of, and during, the stemming operation while the stem is held at one point.

34. In leaf-treating mechanism, the combination, with leaf-holding means, and with leaf-stemming means operative for stemming a leaf away from the point at which the tension device is effective, of a stem-bending tension device effective in the rear of, and during, the stemming operation while the stem is held at one point.

35. In leaf-treating mechanism, the combination, with leaf-holding means, and with leaf-stemming means operative for stemming a leaf away from the point at which the tension device is effective, of a stem-creasing stem-tensioning device effective in the rear of, and during, the stemming operation while the stem is held at one point.

36. In leaf-treating mechanism, the combination, with leaf-holding means effective at separated points in the length of the leaf, and with leaf-stemming means operative for stemming a leaf away from the point at which the tension device is effective, of a stem-creasing tension device effective in the rear of, and during, the stemming operation for forming a substantially U-shaped crease in the stem between such points and thereby tensioning the leaf while the stem is held at one point.

37. The combination, with leaf-stemming means operative for stemming a leaf away from the point at which the tension device is effective, of leaf-feeding mechanism embodying the following devices successively effective in the order named during the feeding of a leaf—viz., leaf-holding means, and a leaf-feeding stem-bending tension device effective in the rear of, and during, the stemming operation while the stem is held at one point.

38. The combination, with leaf-stemming means operative for stemming a leaf away from the point at which the tension device is effective, of leaf-feeding mechanism embodying the following devices successively effective in the order named during the feeding of a leaf—viz., leaf-holding means, and a tension device having a pair of coacting complementary leaf-feeding stem-creasing members effective in the rear of, and during, the stemming operation while the stem is held at one point.

39. The combination, with leaf-stemming means operative for stemming a leaf away from the point at which the tension device is effective, of leaf-feeding mechanism embodying the following devices successively effective in the order named during the feeding of a leaf—viz., leaf-holding means, and a tension device having a pair of coacting stem-creasing feed-belts effective in the rear of, and during, the stemming operation while the stem is held at one point, one of said belts being channeled and the other fitting in such channel.

40. The combination, with leaf-stemming means, of leaf-feeding mechanism embodying the following devices successively effective in the order named during the feeding of a leaf—viz., leaf-holding means, a stem-creasing tension device, and a stem creasing retensioning device coöperative with the leaf-stemming means during the stemming operation while the stem is held at one point.

41. Feed mechanism embodying a feed-belt having a pocket containing a heavy mobile medium permanently carried thereby.

42. Feed mechanism embodying a tubular feed-belt containing a heavy mobile medium.

43. Feed mechanism embodying a tubular feed-belt containing freely-movable solid particles.

44. Feed mechanism embodying a tubular feed-belt containing shot.

45. Feed mechanism embodying a tubular substantially horizontal feed-belt containing a heavy mobile medium in its lower run.

46. Feed mechanism embodying a tubular rubber-faced feed-belt containing a heavy mobile medium.

47. Feed mechanism embodying a pair of coacting feed-belts one channeled and the other fitting in such channel, one of such belts also being tubular and containing a heavy mobile medium for weighting the belt.

48. In leaf-treating mechanism, the combination of a plurality of differentially-effective leaf-holding stem-creasing tension devices separately operative for forming in the stem creases of different depths.

49. In leaf-treating mechanism, the combination of a plurality of differentially-effective leaf-holding and feeding stem-creasing leaf-tensioning feed devices separately operative for forming in the stem creases of different depths.

50. Leaf-treating mechanism embodying tip-gripping means, and also embodying a plurality of severing devices coöperative with the tip-gripping means and of different efficiencies as severing media one of which is a vein-severing member normally operative in contact with the tender tip portion of the stem when a leaf is adjacent thereto and sufficiently yielding to be incapable of severing such tender portion when exerting its maximum force thereupon.

51. Leaf-treating mechanism embodying tip-gripping means, and also embodying the following devices coöperative with the tip-gripping means and of different efficiencies as severing media—viz., a blade-severing device, and a vein severing member normally operative in contact with the tender tip portion of the stem when a leaf is adjacent thereto and sufficiently yielding to be incapable of severing such tender portion when exerting its maximum force thereupon.

52. Leaf-treating mechanism embodying tip-gripping means, and also embodying the following successively-effective devices, coöperative with the tip-gripping means and of increasing efficiencies as severing media—viz., a blade-severing device, and a vein-severing member normally operative in contact with the tender tip-portion of the stem when a leaf is adjacent thereto and sufficiently yielding to be incapable of severing such tender portion when exerting its maximum force thereupon.

53. Leaf-treating mechanism embodying tip-gripping means, and also embodying the following devices coöperative with the tip-gripping means and of different efficiencies as severing media—viz., a blade-puncturing device, and a vein-severing member normally operative in contact with the tender tip portion of a stem when a leaf is adjacent thereto, and sufficiently yielding to be incapable of severing such tender portion when exerting its maximum force thereupon.

54. Leaf-treating mechanism embodying tip-gripping means, and also embodying the following devices coöperative with the tip-gripping means and of different efficiencies as severing media—viz., a blade-puncturing wheel, and a vein-severing member normally operative in contact with the tender tip portion of the stem when a leaf is adjacent thereto, and sufficiently yielding to be incapable of severing such tender portion when exerting its maximum force thereupon.

55. Leaf-treating mechanism embodying tip-gripping means, and also embodying the following devices coöperative with the tip-gripping means and of different efficiencies as severing media—viz., a plurality of differential blade-puncturing devices, and a vein-severing member normally operative in contact with the tender tip portion of the stem, when a leaf is adjacent thereto and sufficiently yielding to be incapable of severing such tender portion when exerting its maximum force thereupon.

56. Leaf-treating mechanism, embodying tip-gripping means, and also embodying the following devices coöperative with the tip-gripping means and of different efficiencies as severing media—viz., a blade-severing device and a rotary vein-severing member normally operative in contact with the tender tip portion of the stem when a leaf is adjacent thereto, and sufficiently yielding to be incapable of severing such tender portion when exerting its maximum force thereupon.

57. Leaf-treating mechanism embodying tip-gripping means, and also embodying the following devices coöperative with the tip-gripping means and of different efficiencies as severing media—viz., a blade-severing device, and a rotary vein-severing brush, having alternate rigid and yielding members and normally operative in contact with the tender tip portion of the stem when a leaf is adjacent thereto and sufficiently yielding to be incapable of severing such tender portion when exerting its maximum force thereupon.

58. Leaf-treating mechanism embodying tip-gripping means and also embodying the following devices coöperating with the tip-gripping means and of different efficiencies as severing media—viz., a blade-severing device, and a pair of oppositely-rotative vein-severing members having alternate rigid and yielding portions and normally operating in contact with opposite sides of the tender tip portion of the stem when a leaf is adjacent thereto, and sufficiently yielding to be incapable of severing such tender portion when exerting their maximum force thereupon.

59. Leaf-treating mechanism embodying tip-gripping means, and also embodying the following devices coöperating with the tip-gripping means and of different efficiencies as severing media—viz., a blade-severing device and a pair of vein-severing members having alternate rigid and yielding portions and normally operative in contact with opposite sides of the tender tip portion of the stem when a leaf is adjacent thereto and sufficiently yielding to be incapable of severing such tender portion when exerting their maximum force thereupon, and oppositely rotative in a plane substantially parallel with the leaf-stem.

60. Leaf-treating mechanism embodying tip-gripping means, a blade-severing device coöperative with the tip-gripping means, and a vein-breaking member also coöperative with the tip-gripping means and of higher efficiency as a severing medium than the blade-severing device and normally operative in contact with the tender tip portion of the stem, when a leaf is adjacent thereto and sufficiently yielding to be incapable of severing such tender portion when exerting its maximum force thereupon, and effective for parting the veins without cutting them.

61. Leaf-treating mechanism embodying tip-gripping means, a blade severing device coöperating with the tip-gripping means, a vein-breaking member also coöperating with the tip-gripping means and of higher efficiency as a severing medium than the blade severing device and normally operative in contact with the tender tip portion of the stem when a leaf is adjacent thereto and sufficiently yielding to be incapable of severing such tender tip portion when exerting its maximum force thereupon and effective for parting the veins without cutting them, and leaf-stemming means coöperative therewith.

62. Leaf-treating mechanism embodying tip-gripping means, a blade-severing device coöperative with the tip-gripping means, and a vein-breaking member also coöperative with the tip-gripping means and having a plurality of blunt members of higher efficiency as severing media than the blade-severing device and normally operative in contact with the tender tip-portion of the stem when a leaf is adjacent thereto, and sufficiently yielding to be incapable of severing such tender portion when exerting their maximum force thereupon and effective for parting the veins without cutting them.

63. Leaf-treating mechanism embodying tip-gripping means, a blade-severing device coöperative with the tip-gripping means, and a rotary vein-breaking member also coöp- erative with the tip-gripping means, and having a plurality of blunt members of higher efficiencies as severing media than the blade-severing device, and normally operative in contact with the tender tip-portion of the stem when a leaf is adjacent thereto and sufficiently yielding to be incapable of severing such tender portion when exerting their maximum force thereupon and effective for parting the veins without cutting them.

64. Leaf-trimming mechanism embodying a plurality of successively-effective blade-severing devices incapable of severing the veins and stem and of increasing efficiencies as blade-severing media.

65. Leaf-treating mechanism embodying a plurality of successively-effective blade-puncturing devices incapable of severing the veins and stem and of increasing efficiencies as blade-puncturing media.

66. Leaf-treating mechanism embodying a plurality of successively-effective blade-puncturing devices incapable of severing the veins and stem and each succeeding device having a plurality of puncturing members larger than those of a preceding device.

67. Leaf-treating mechanism embodying a plurality of successively-effective rotary blade-puncturing devices incapable of severing the veins and stem, and each succeeding device having a plurality of puncturing members of greater cross-sectional length in the direction of rotation than those of a preceding device.

68. Leaf-treating mechanism embodying a plurality of successively-effective rotary blade-puncturing devices incapable of severing the veins and stem, and each succeeding device having a plurality of puncturing members spaced differently from those of another device.

69. Leaf-treating mechanism embodying a plurality of successively-effective rotary blade-puncturing devices incapable of severing the veins and stem, and each succeeding device having a plurality of puncturing members spaced differently from, and of greater cross-sectional length in the direction of rotation than, those of a preceding device.

70. Leaf-treating mechanism embodying the following devices successively operative in the order named, viz., blade-severing and vein-severing means of different efficiencies as severing media, a clearing device for forcing back the blade longitudinally of the leaf and in the direction of stemming, and a re-gripping device for engaging the bare portion of the stem.

71. Leaf-treating mechanism embodying the following devices successively operative in the order named, viz., blade-severing and vein-severing means of different efficiencies as a severing media, a rotary clearing device for forcing back the blade longitudinally of the leaf and in the direction of stemming, and a re-gripping device for engaging the bare portion of the stem.

72. Leaf-treating mechanism embodying the following devices successively operative in the order named, viz., blade-severing and vein-severing means of different efficiencies as a severing media, a rotary clearing brush for forcing back the blade longitudinally of the leaf and in the direction of stemming, and a re-gripping device for engaging the bare portion of the stem.

73. Leaf-treating mechanism embodying leaf-feeding means, and a plurality of successively-effective stemming devices located at different points both transversely and lengthwise of the direction of feed of the leaf and having yielding surfaces of different efficiencies as stemming media, the stemming device of least efficiency coöperating with the tender tip portion of the leaf, and that of great efficiency with the tough butt portion of the leaf.

74. Leaf-treating mechanism embodying leaf-feeding means, and a plurality of successively-effective stemming devices located at different points both transversely and lengthwise of the direction of feed of the leaf, and having yielding surfaces and operative at different angles to the line of feed of such leaf, the stemming device of least efficiency coöperating with the tender tip portion of the leaf, and that of great efficiency with the tough butt portion of the leaf.

75. Leaf-treating mechanism embodying leaf-feeding means, and a plurality of successively-effective stemming devices located at different points both transversely and lengthwise of the direction of feed of the leaf, and having yielding surfaces and operative at successively-steeper angles to the line of feed of such leaf, the stemming device of least efficiency coöperating with the tender tip portion, and that of great efficiency with the tough butt portion of the leaf.

76. Leaf-treating mechanism embodying leaf-feeding means, and a plurality of successively-effective rotary stemming devices located at different points both transversely and lengthwise of the direction of feed of the leaf, and having yielding surfaces and operative at successively-steeper angles to the line of feed of such leaf, the stemming device of least efficiency coöperating with the tender tip portion of the leaf, and that of great efficiency with the tough butt portion of the leaf.

77. A tobacco-leaf stemming machine, comprising mechanism adapted to receive and forwardly convey the leaves, mechanism operative for separating the blades from the leaf-stalks, said mechanism embodying a suitably arranged brush operating substantially lengthwise of the leaf-stalk and having its body made up of a plurality of firm and yielding elements, and mechanism for operating said brush.

78. A tobacco-leaf stemming machine, comprising mechanism adapted to receive and forwardly convey the leaves, mechanism operative for separating the blades from the leaf-stalks, said mechanism embodying a member arranged to operate upon the leaf, said member being provided with a plurality of firm and yielding elements arranged in alternation, said elements being effective for brushing the blade-portions away from the stalk without mutilating the former.

79. A tobacco-leaf stemming machine, comprising mechanism adapted to receive and forwardly convey the leaves, mechanism operative for separating the blades from the leaf-stalks, said mechanism embodying a member arranged to operate upon the leaf, said member being provided with a plurality of firm and yieldable elements arranged in alternation, said elements being effective also for brushing the blade-portions away from the stalk without mutilating the former, mechanism for advancing the conveying mechanism, and mechanism for operating the brushing member.

80. A tobacco-leaf stemming machine, comprising mechanism operative to receive and feed the leaves, mechanism operative to separate the blades from the leaf-stalk, said mechanism embodying rotating members arranged to operate lengthwise of the leaf, said members each being provided with a plurality of firm or rigid and yielding elements arranged in alternation on each member and adapted so that the firm elements co-act with the yielding elements when rotating, whereby to brush away the blade-portions of the leaf.

81. A tobacco-leaf stemming machine, comprising mechanism operative to receive and feed the leaves, mechanism operative to separate the blades from the leaf-stalk, said mechanism embodying rotating members each being provided with a plurality of rigid and yieldable elements arranged in alternation upon each member, and adapted, when the members rotate, the yieldable members to co-act with the rigid elements, whereby to clean said blade-portions away from the stalk without injury to the former, mechanism for rotating the members and mechanism for operating the leaf conveying mechanism.

82. A tobacco-leaf stemming machine, comprising mechanism operative to receive and feed the leaves, mechanism operative to separate the blades from the stalks, and mechanism embodying rotating members, each of which is provided with a plurality of rigid and yieldable elements, arranged in alternation upon each member, the rigid elements of one member being adapted to co-act with the yieldable elements, of the other member when the members are rotating, whereby to brush away said blade-portions from the stalk without injury to the former.

83. A tobacco-leaf stemming machine comprising mechanism operative to receive and feed the leaves, mechanism embodying devices adapted to receive, hold and stretch the leaves, mechanism operative to separate the blades from the stalks, said mechanism embodying rotating members each of which is provided with a plurality of rigid and yieldable elements arranged in alternation, said elements being effective for brushing said blade-portions away from the stalk.

84. A tobacco-leaf stemming machine, comprising mechanism operative to receive and feed the leaves, mechanism embodying devices adapted to receive, hold and stretch the leaves, mechanism operative to separate the blades from the stalks, said mechanism embodying rotating members each of which is provided with a plurality of teeth and tufts which co-act when the members rotate, whereby to clean said blades from the stalk without injury to the former, means for rotating the members, and means to operate the leaf-conveying mechanism.

85. A tobacco-leaf stemming machine, comprising mechanism adapted to receive and feed the leaves, mechanism operative to separate the blades from the stalks, said mechanism embodying members provided with a plurality of teeth and tufts which co-act when the members are operated, whereby to clean said blades from the stalk without injury to the former.

86. A tobacco-leaf stemming machine, comprising mechanism adapted to receive and feed the leaves, mechanism operative to separate the blades from the stalks, said mechanism embodying members provided with a plurality of teeth and tufts which co-act when the members are operated, whereby to clean said blades from the stalk without injury to the former, means for rotating the members, and means to operate the leaf-conveying mechanism.

87. A tobacco-leaf stemming machine, having stemming mechanism operative for separating the blade-portions of the leaves from the stalk, said mechanism embodying leaf-stemming members rotatively mounted and operative substantially lengthwise of the stalk, and each having a set of rigid and yieldable leaf elements movable lengthwise of the leaf and for brushing the blade-portions away from the stalk without tearing the former.

88. A tobacco-leaf stemming machine, having stemming mechanism operative for separating the blade-portions of leaves from the stalks, said mechanism embodying members operative substantially lengthwise of the stalk, and having a set of rigid and yieldable elements movable lengthwise of the leaf, and so organized as to be effective for brushing the blade portions away from the stalk without tearing the former.

89. A tobacco-leaf stemming machine, having stemming mechanism operative for separating the blades from the stalk, said mechanism embodying members operative substantially lengthwise of the leaf and having sets of rigid and yielding elements located in alternation and movable lengthwise of the leaf for brushing the blade-portions away from the stalk without tearing the former.

90. A tobacco-leaf stemming machine, having stemming mechanism operative for separating the blades from the stalk, said mechanism embodying members operative substantially lengthwise of the leaf, and having of a set of rigid and yielding elements disposed in alternation and movable lengthwise of the leaf for brushing the blade-portions away from the stalk without tearing the former, and mechanism for operating the stemming mechanism.

91. A tobacco-leaf stemming machine, comprising mechanism to convey and feed the leaves, stemming mechanism operative for separating the blade from the stalk, said mechanism embodying members operative substantially lengthwise of the stalk, and having sets of rigid and yielding elements movable lengthwise of the leaf for brushing the blade away from the stalk without tearing the former.

92. A tobacco-leaf stemming machine, comprehending mechanism to forwardly feed the leaves, stemming mechanism operative for separating the blades from the stalks, said mechanism embodying brushes operative substantially lengthwise of the leaf and each having a set of alternating rigid and yielding elements disposed thereon for brushing the blade away from the stalk without tearing the former.

93. A tobacco-leaf stemming machine, comprising mechanism to forwardly feed the leaves, stemming mechanism operative for separating the blades from the stalks, said mechanism embodying brushes operative substantially lengthwise of the leaf and having a set of alternating rows of rigid and yielding elements movable lengthwise of the leaf, and effective for brushing the blade-portions away from the stalk without tearing the former.

94. A tobacco-leaf stemming machine, comprising a leaf feeding device, mechanism operative for separating the blade from the stalk, said mechanism embodying brushes operative substantially lengthwise of the leaf and having brush-tufts and rigid elements disposed in alternation and movable lengthwise of the leaf for brushing the blade-portions away from the stalk without tearing the former.

95. A tobacco-leaf stemming machine, comprising mechanism for conveying and feeding leaves, leaf-stemming mechanism for separating the blade from the stalks, said mechanism embodying a pair of oppositely rotative intermeshing brushes operative substantially lengthwise of the leaf, and each having a circuit of regularly-spaced, rigid and yielding leaf-stemming elements disposed in alternating rows and movable lengthwise of the leaf, the rigid and yielding elements intermeshing with each other, said brushes being effective for brushing the blade-portions away from the stem without tearing the former.

96. A tobacco-leaf stemming machine, comprising mechanism adapted to receive and forwardly convey the leaves, mechanism operative for separating the blades from the leaf-stalks, said mechanism embodying a suitably arranged brush operating substantially lengthwise of the leaf-stalk and having its body made up of a plurality of firm and yielding elements in alternation, and mechanism for operating said brush.

97. A tobacco leaf stemming machine comprising a leaf feeding mechanism, mechanism for separating the blade from the stalks, said mechanism embodying a brush operative substantially lengthwise of the leaf and having a set of alternating yielding and rigid elements for exerting its force upon the blade portion in lines parallel to the stalk and effective for brushing the blade portions away from the stalk without tearing the former.

98. A tobacco leaf stemming machine comprising a leaf feeding device, mechanism operative for separating the blade from the stalk, said mechanism embodying brushes operative substantially lengthwise of the leaf and having brush-tufts and rigid elements disposed in alternation and in rows alternating with one another, for exerting its force upon the blade portions in lines parallel to the stalk and effective for brushing the blade portions away from the stalk without tearing the former.

99. A tobacco stemming machine comprising mechanism for conveying and feeding leaves, leaf stemming mechanism for separating the blade from the stalks said mechanism embodying a pair of oppositely rotative intermeshing brushes operative substantially lengthwise of the leaf and each having a circuit of regularly-spaced rigid and yielding leaf-stemming elements disposed in alternating rows, the rigid and yielding elements intermeshing with each other, said brushes exerting their force upon the blade portions in lines parallel to the stem and effective for brushing the blade portions away from the stem without tearing the former.

GEORGE P. BUTLER.

Witnesses:
WILLIS A. ANDRUSS,
FRED. J. DOLE.